US010443004B2

(12) United States Patent
Jack et al.

(10) Patent No.: US 10,443,004 B2
(45) Date of Patent: Oct. 15, 2019

(54) FIRST STAGE PROCESS CONFIGURATIONS IN A 2-STAGE BIO-REFORMING REACTOR SYSTEM

(71) Applicant: Sundrop Fuels, Inc, Longmont, CO (US)

(72) Inventors: Douglas S. Jack, Longmont, CO (US); Andrew W. Broerman, Frederick, CO (US)

(73) Assignee: Sundrop IP Holdings, LLC, Longmont, CO (US)

( * ) Notice: Subject to any disclaimer, the term of this patent is extended or adjusted under 35 U.S.C. 154(b) by 0 days.

(21) Appl. No.: 15/963,431

(22) Filed: Apr. 26, 2018

(65) Prior Publication Data

US 2018/0312769 A1 Nov. 1, 2018

Related U.S. Application Data

(60) Provisional application No. 62/490,891, filed on Apr. 27, 2017.

(51) Int. Cl.
*C10J 3/48* (2006.01)
*C10J 3/46* (2006.01)
(Continued)

(52) U.S. Cl.
CPC .............. *C10J 3/485* (2013.01); *B02C 23/10* (2013.01); *B04C 5/26* (2013.01); *B04C 5/30* (2013.01);
(Continued)

(58) Field of Classification Search
CPC ..................... C10J 2300/0993; C10J 3/721
See application file for complete search history.

(56) References Cited

U.S. PATENT DOCUMENTS 4,584,948 A 4/1986 Syred et al.
8,814,961 B2 8/2014 Perkins et al.
(Continued)

FOREIGN PATENT DOCUMENTS

WO 2013148610 A1 10/2013
WO 2013158343 A1 10/2013
(Continued)

OTHER PUBLICATIONS

Arabi et al (Syngas production by plasma treatments of alcohols, bio-oils and wood, Journal of Physics: Conference Series 406 pp. 1-8, 2012) (Year: 2012).*
(Continued)

*Primary Examiner* — Matthew J Merkling
(74) *Attorney, Agent, or Firm* — Rutan & Tucker, LLP

(57) ABSTRACT

Disclosed herein is an integrated plant including, in some embodiments, an interconnected set of two or more stages of reactors forming a bio-reforming reactor configured to generate syngas from wood-containing biomass. A first stage of the bio-reforming reactor is configured to cause a set of chemical reactions in the biomass to produce reaction products of constituent gases, tars, chars, and other components. The first stage includes a fluidized-bed gasifier, a fluidized-bed combustor, and a moving-bed filtration system, each of which includes media inputs and outputs to respectively receive and supply heat-absorbing media to another operation unit for recirculation in a media recirculation loop. The moving-bed filtration system includes a tar pre-reformer configured to capture and reform heavier tars into lighter tars for subsequent processing in one or more fuel-producing reactor trains. Fuel products produced by the one or more reactor trains have a biogenic content of between 50% and 100%.

20 Claims, 8 Drawing Sheets

(51) Int. Cl.
  *C10J 3/72*   (2006.01)
  *C10J 3/84*   (2006.01)
  *B04C 5/30*   (2006.01)
  *B04C 5/26*   (2006.01)
  *B02C 23/10*  (2006.01)

(52) U.S. Cl.
  CPC .............. *C10J 3/466* (2013.01); *C10J 3/721* (2013.01); *C10J 3/84* (2013.01); *C10J 2300/0916* (2013.01); *C10J 2300/0959* (2013.01); *C10J 2300/0976* (2013.01); *C10J 2300/1659* (2013.01); *C10J 2300/1665* (2013.01); *C10J 2300/1853* (2013.01)

(56) References Cited

U.S. PATENT DOCUMENTS

| | | |
|---|---|---|
| 8,961,628 B2 | 2/2015 | Ampulski et al. |
| 9,011,560 B2 | 4/2015 | Simmons et al. |
| 9,126,173 B2 | 9/2015 | Ampulski et al. |
| 9,295,961 B2 | 3/2016 | Laska et al. |
| 9,416,077 B2 | 8/2016 | Kelfkens et al. |
| 9,447,326 B2 | 9/2016 | Ferraro et al. |
| 9,663,363 B2 | 5/2017 | Simmons et al. |
| 2011/0062012 A1* | 3/2011 | Robinson .................. C10J 3/00 201/2.5 |
| 2012/0238646 A1* | 9/2012 | Bi .............................. C10L 3/08 518/702 |
| 2013/0247448 A1 | 9/2013 | Ampulski et al. |
| 2013/0248760 A1 | 9/2013 | Ampulski et al. |
| 2014/0001026 A1 | 1/2014 | Baird et al. |
| 2014/0008580 A1* | 1/2014 | Liu .............................. C10J 3/56 252/373 |
| 2014/0241949 A1 | 8/2014 | Perkins et al. |
| 2014/0328730 A1* | 11/2014 | Takafuji .................. C10J 3/482 422/187 |
| 2014/0341785 A1 | 11/2014 | Simmons et al. |
| 2014/0373677 A1* | 12/2014 | Stumpf ..................... C21B 3/00 75/10.38 |
| 2016/0152905 A1 | 6/2016 | Kelfkens et al. |
| 2017/0066983 A1 | 3/2017 | Jack et al. |

FOREIGN PATENT DOCUMENTS

| | | |
|---|---|---|
| WO | 2013191897 A1 | 12/2013 |
| WO | 2014043552 A1 | 3/2014 |
| WO | 2014204519 A1 | 12/2014 |
| WO | 2016086141 A1 | 6/2016 |

OTHER PUBLICATIONS

Search report from WIPO, dated Jul. 10, 2018, 12 pages.

* cited by examiner

FIRST STAGE PROCESS CONFIGURATIONS IN A 2-STAGE BIO-REFORMING REACTOR SYSTEM

CROSS-REFERENCE

This application claims the benefit under 35 USC 119 of U.S. Provisional Patent Application No. 62/490,891, filed Apr. 27, 2017, titled "FIRST STAGE PROCESS CONFIGURATIONS IN A 2-STAGE BIO-REFORMING REACTOR SYSTEM," which is hereby incorporated herein by reference in its entirety.

FIELD

The design generally relates to an integrated process plant having at least a two-stage biomass reforming reactor with a number of configuration options for the first stage of the bio-reforming reactor.

BACKGROUND

Many economists plan for reducing global-warming emissions include different technologies to create, track, and measure an amount of renewable carbon in fuel sources. The renewable carbons in these fuels are a result of the biogenic content of the feedstocks used to create these fuels. The specific renewable (or biogenic) carbon content of these biofuels vary with the configuration of the production process.

SUMMARY

Systems and methods are discussed for an integrated process plant having at least a two-stage biomass reforming reactor with a number of configuration options for the first stage including various configurations for management of heat-absorbing media.

Disclosed herein is an integrated plant including, in some embodiments, an interconnected set of two or more stages of reactors forming a bio-reforming reactor configured to generate syngas for any one or more reactor trains. A first stage of the bio-reforming reactor includes a fluidized-bed gasifier that has one or more biomass inputs to receive wood-containing biomass, one or more media inputs to receive heat-absorbing media for circulation of the media in a vessel of the gasifier, and one or more outputs to supply at least the media to another operation unit for recirculation in a media recirculation loop. The first stage of the bio-reforming reactor further includes a fluidized-bed combustor that has one or more media inputs to receive the media for circulation of the media in a vessel of the combustor, as well as one or more outputs to supply at least the media to another operation unit for recirculation in the media recirculation loop. The first stage of the bio-reforming reactor further includes a moving-bed filtration system that has one or more media inputs to receive the media for packing a filtration bed of the moving-bed filtration system, as well as one or more outputs to supply at least the media to another operation unit for recirculation in the media recirculation loop. The first stage is configured to cause a set of chemical reactions in the biomass to produce reaction products of constituent gases, tars, chars, and other components, some of which reaction products exit the first stage through the moving-bed filtration system as a raw syngas. A second stage of the bio-reforming reactor has an input configured to receive a stream of the raw syngas. The stream of the raw syngas is chemically reacted within one or more reactors of the second stage to yield a chemical grade syngas by further processing including at least cracking light hydrocarbons ($C_1$-$C_4$) into constituent molecules for the any one or more of the selected reactor trains. The one or more reactor trains are selected from 1) a methanol synthesis reactor train, 2) a methanol-to-gasoline reactor train, and 3) a Fischer-Tropsch reactor train. Fuel products produced by the one or more reactor trains have a biogenic content of between 50% and 100%.

Also disclosed herein is a method of an integrated plant including, in some embodiments, forming a bio-reforming reactor having at least a first stage of the bio-reforming reactor interconnected with a second stage of the bio-reforming reactor, generating syngas with the bio-reforming reactor, and managing heat-absorbing media used in generating the syngas with the bio-reforming reactor. Generating the syngas includes feeding wood-containing biomass to the bio-reforming reactor and generating the syngas from the biomass for any one or more reactor trains downstream of the second stage of the bio-reforming reactor. The one or more reactor trains are selected from 1) a methanol synthesis reactor train, 2) a methanol-to-gasoline reactor train, and 3) a Fischer-Tropsch reactor train, where any fuel products produced by the one or more reactor trains have a biogenic content of between 50% and 100%. Feeding the biomass to the bio-reforming reactor includes receiving the biomass by one or more biomass inputs of a fluidized-bed gasifier of the first stage of the bio-reforming reactor. Generating the syngas further includes causing a set of chemical reactions in the biomass to produce reaction products of constituent gases, tars, chars, and other components; sending at least some of the reaction products through a moving-bed filtration system of the first stage of the bio-reforming reactor to produce a stream of raw syngas; and receiving the stream of raw syngas by one or more inputs of one or more reactors of the second stage of the bio-reforming reactor. The raw syngas is subjected to further processing within the one or more reactors of the second stage to yield a chemical grade syngas. The further processing includes at least cracking light hydrocarbons ($C_1$-$C_4$) into constituent molecules for the one or more selected reactor trains. Managing the heat-absorbing media used in generating the syngas includes receiving the media by one or more media inputs of the gasifier, circulating the media in a vessel of the gasifier, and sending the media through one or more outputs of the gasifier to supply the media to another operation unit in a media recirculation loop. Managing the heat-absorbing media used in generating the syngas also includes receiving the media by one or more media inputs of a fluidized-bed combustor of the first stage of the bio-reforming reactor, circulating the media in a vessel of the combustor, and sending the media through one or more outputs of the combustor to supply the media to another operation unit in the media recirculation loop. Managing the heat-absorbing media used in generating the syngas also includes receiving the media by one or more media inputs of the moving-bed filtration system, packing a filtration bed of the moving-bed filtration system, and sending the media through one or more outputs of the moving-bed filtration system to supply the media to another operation unit in the media recirculation loop.

BRIEF DESCRIPTION OF THE DRAWINGS

The multiple drawings refer to the example embodiments of the design.

Figure 1:
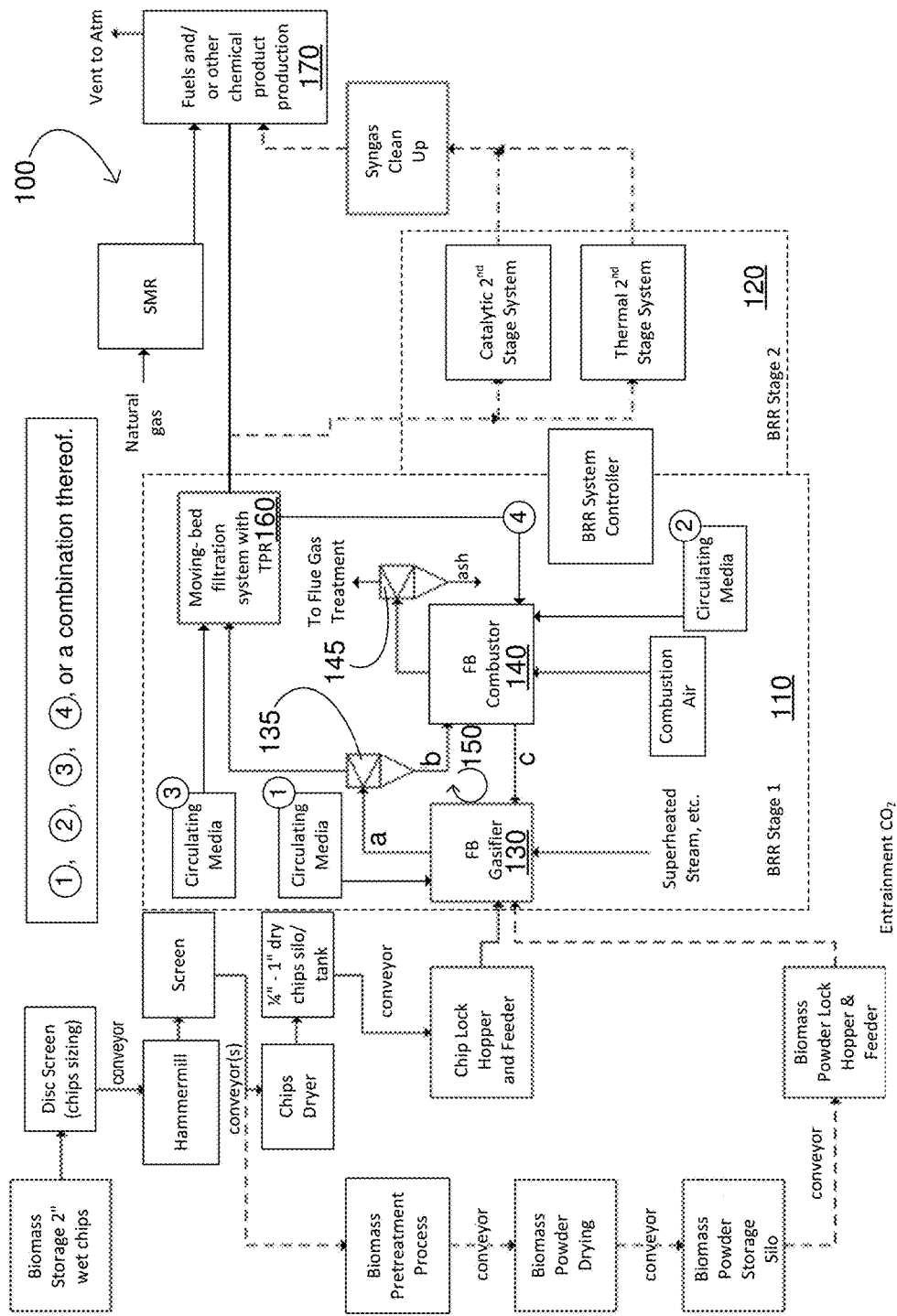
FIG. 1 illustrates a diagram of an integrated plant for generating syngas with at least a two-stage bio-reforming reactor including a first stage having a number of first-stage configurations interconnected with a second stage in accordance with some embodiments.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific chemicals, named components, connections, types of heat sources, specific numeric values given for an example design, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Further, specific numeric references such as first reactor, can be made. However, the specific numeric reference should not be interpreted as a literal sequential order but rather interpreted that the first reactor is different than a second reactor. Thus, the specific details set forth are merely exemplary. The specific details can be varied from and still be contemplated to be within the spirit and scope of the present design. The term coupled is defined as meaning connected either directly to the component or indirectly to the component through another component. Concepts discussed for a first embodiment may be implemented in another embodiment where that is logically possible.

Figure 4:
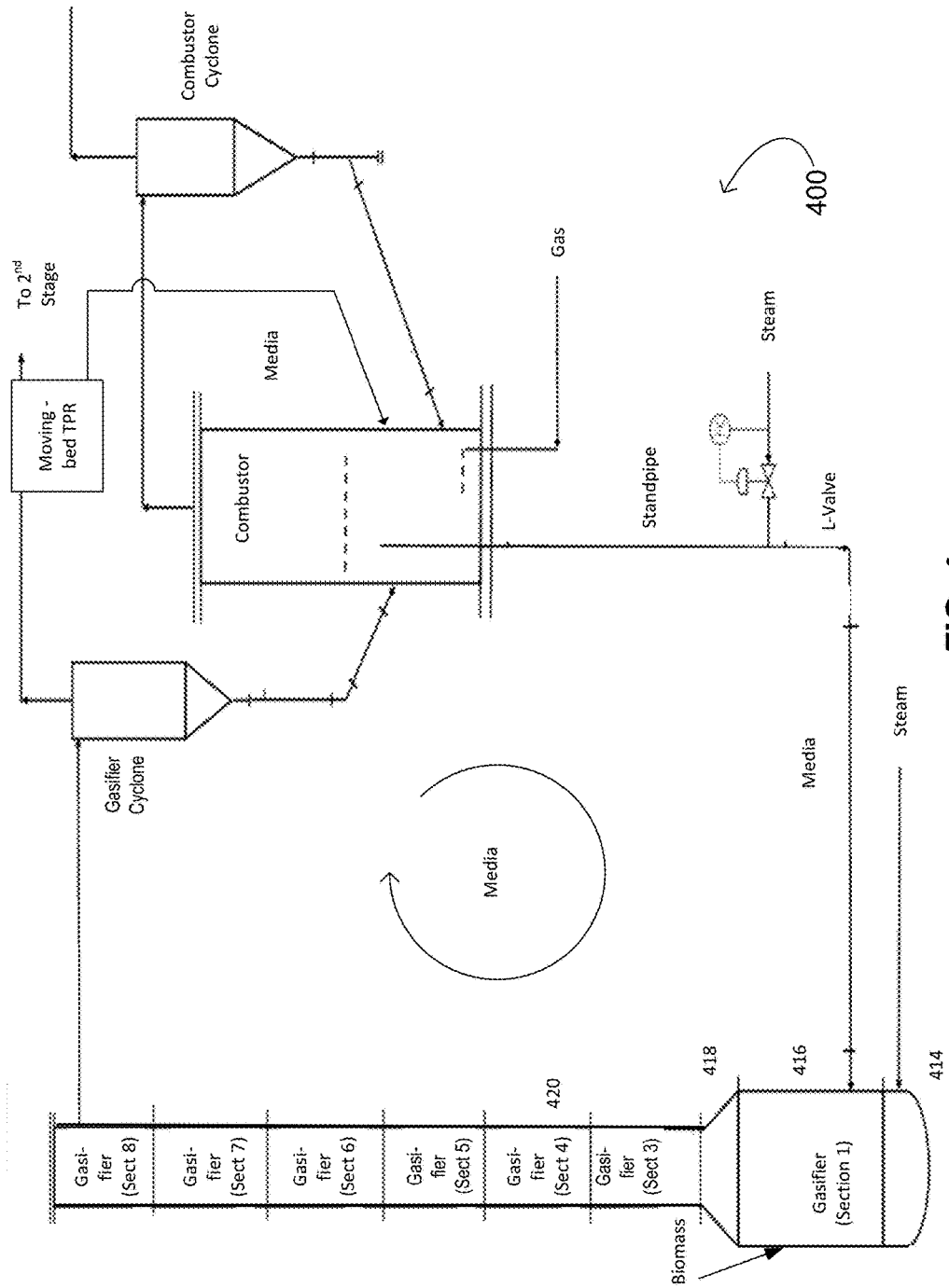
FIG. 4 illustrates a diagram of a gasifier of the first stage having multiple sections that form a shape and an operation of the gasifier coupled with a combustor in accordance with some embodiments.
Figure 5:
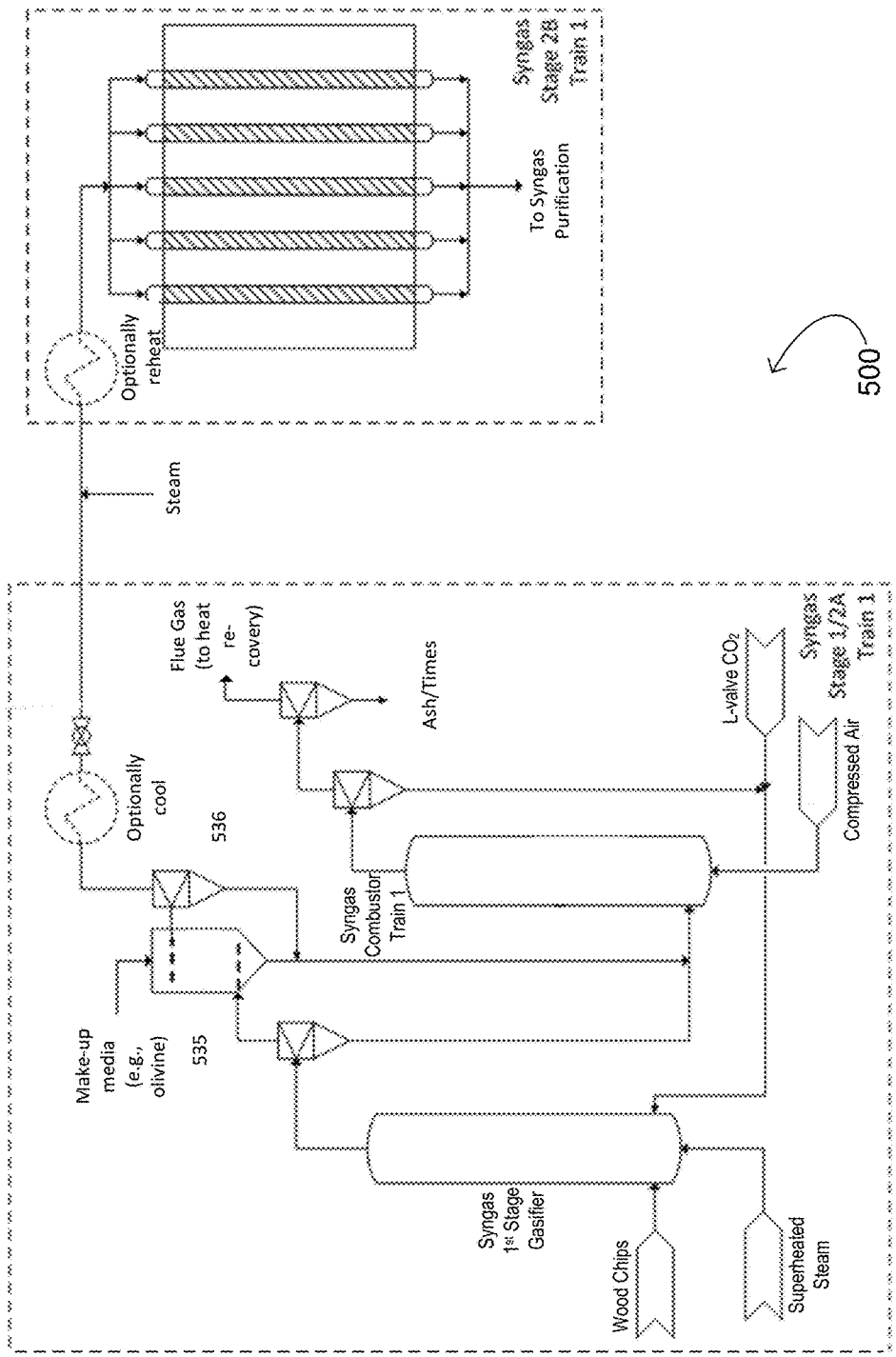
FIG. 5 illustrates a diagram of a densely packed moving bed coupled to each of the gasifier and the combustor of the first stage of the bio-reforming reactor by way of a cyclone system in accordance with some embodiments.

In general, before describing any particular embodiments, an integrated biofuels plant for biomass conversion is disclosed that includes a bio-reforming reactor ("BRR") system to generate syngas from biomass for another chemical process that uses the reaction syngas product derived from the biomass in the bio-reforming reactor. The integrated biofuels plant in its various configurations for biomass conversion employs a multi-stage BRR system such as a two-stage BRR system, in which the renewable carbon content of gasoline, jet fuel, diesel fuel, and/or similar fuels, are optimized for value to include: 1) Products with 100% biogenic carbon content and 2) products with 50-100% biogenic carbon. FIGS. 4, 5 and 6 show various examples of how the BRR may be implemented.

Stage 2 of the BRR system (i.e., BRR Stage 2) of the biomass-to-syngas ("BTS") process can be configured to reform bio-syngas concurrently with natural gas and/or recycled process gas streams to maximize overall process energy efficiency and/or minimize capital costs to produce fuel products with 50-100% biogenic carbon.

BRR Stage 2 can be a conventional tubular reactor that employs a proprietary catalyst tailored to crack phenolic tars (e.g., $C_{6+}$) and reform light hydrocarbon gases (e.g., $C_1$-$C_4$) in bio-syngas produced by biomass gasification in Stage 1 of the BRR.

BRR Stage 1 of the BTS process can be configured in many ways as set forth herein.

A number of example processes for and apparatuses associated with biomass conversion will now be described, particularly with respect to flexible configuration options for the first stage of the bio-reforming reactor, ways to manage the solids in the system, and a tar pre-former ("TPR") unit.

First Stage Process Configurations in a Bio-Reforming Reactor System

FIG. 1 illustrates a diagram of an integrated plant 100 for generating syngas with at least a two-stage bio-reforming reactor including a first stage 110 having a number of first-stage configurations interconnected with a second stage 120 in accordance with some embodiments.

Referring to FIG. 1, there are a number of process configuration options and range of process conditions that are possible for the first stage of a two-stage bio-reforming reactor system. The use of these different configurations will depend on the type and quality of the biomass being used, availability of alternate or supplemental fuels such as natural gas, plant economics, and trade-offs between capital cost, operating cost, product value, environmental performance and desired product slate for the plant. The size of the plant, or at least individual units within the plant, is also an important factor as constructability and transport of the individual components will impact configuration choices.

The first stage of the bio-reforming reactor includes a reactor such as a fluidized-bed gasifier 130 that has one or more biomass inputs to receive wood-containing biomass, one or more media inputs to receive heat-absorbing media for circulation of the media in a vessel of the gasifier, and one or more outputs to supply at least the media to another operation unit for recirculation in a media recirculation loop 150. The first stage of the bio-reforming reactor also includes a combustor such as a fluidized-bed combustor 140 that has one or more media inputs to receive the media for circulation of the media in a vessel of the combustor, as well as one or more outputs to supply at least the media to another operation unit for recirculation in the media recirculation loop. The first stage of the bio-reforming reactor further includes a moving-bed filtration system 160 that has one or more media inputs to receive the media for packing a filtration bed of the moving-bed filtration system, as well as one or more outputs to supply at least the media to another operation unit for recirculation in the media recirculation loop. The first stage is configured to cause a set of chemical reactions in the biomass to produce reaction products of constituent gases, tars, chars, and other components, some of which reaction products exit the first stage through the moving-bed filtration system as a stream of raw syngas.

The second stage of the bio-reforming reactor has an input configured to receive the stream of raw syngas. The stream of raw syngas is chemically reacted within one or more reactors of the second stage to yield a chemical grade syngas by further processing including at least cracking light hydrocarbons ($C_1$-$C_4$) into constituent molecules for the any one or more reactor trains 170 selected from 1) a methanol synthesis reactor train, 2) a methanol-to-gasoline reactor train, and 3) a Fischer-Tropsch reactor train. Fuel products produced by the one or more reactor trains have a biogenic content of between 50% and 100%.

The integrated plant further includes a first cyclone system 135, which is also referred to herein as the primary cyclone system, gasifier cyclone system, or the like, and which can include one or more cyclones, optionally arranged in parallel, depending upon separation loads. The first cyclone system is configured to receive a stream of the heat-absorbing media and the reaction products of constituent gases, tars, chars, and other components from the gasifier by way of a first portion of the media recirculation loop. The first cyclone system is also configured to separate at least the media and the chars from the stream and supply the media and the chars to the combustor by way of a second portion of the media recirculation loop. The combustor is configured to further combust at least the char in the presence of the media as received from the first cyclone system to produce a waste stream of gas and ash. The combustor is also configured to provide a stream of media having a reduced amount of char to the gasifier by way of a third portion of the media recirculation loop. The first, second, and third portions of the media recirculation loop are indicated in FIG. 1 respectively by labels 'a,' 'b,' and 'c.'

As shown, heat-absorbing media, "circulating media," or simply "media," as used herein, can be added to the media recirculation loop as makeup media by way of one or more entry points to the media recirculation loop. In one example, makeup media is added to the media recirculation loop by way of the one or more media inputs of the gasifier configured to receive the media. (This is option 1 in FIG. 1.) In another example, makeup media is added to the media recirculation loop by way of the one or more media inputs of the combustor configured to receive the media. (This is option 2 in FIG. 1.) In yet another example, makeup media is indirectly added to the media recirculation loop by way of one or more media inputs of the moving-bed filtration system configured to receive the media. The moving-bed filtration system is configured to provide the makeup media to the combustor in a stream of the media including a reduced amount of heavier tars than a stream of the reaction products including the tars from the gasifier. (This is option 3 combined with 4 in FIG. 1.)

The integrated plant further includes a second cyclone system 145, which is also referred to herein as the secondary cyclone system, combustor cyclone system, or the like, and which can include one or more cyclones, optionally arranged in parallel, depending upon separation loads. The second cyclone system is configured to receive the waste stream of gas and ash from the combustor. The second cyclone system is also configured to separate the gas from the waste stream for treatment of the gas before emitting it to the atmosphere. The second cyclone system is also configured to separate the ash from the waste stream for disposal.

The integrated plant further includes a tar pre-reformer ("TPR") as part of the moving-bed filtration system, which is designed to (1) remove fines solid particles (char, fines, soot, etc.); (2) chemically react heavy tar components to light hydrocarbon components. As such, the TPR is configured to capture heavier tars and reform the heavier tars into lighter tars. The first cyclone system is configured to separate at least some of the tars from the stream of the media and the reaction products of constituent gases, tars, chars, and other components from the gasifier by way of the first portion of the media recirculation loop. The first cyclone system is also configured to supply a stream of the reaction products including the tars to the moving-bed filtration system for reforming the heavier tars into the lighter tars with the TPR.

In summary, the first stage of the BRR system consists of a fluidized bed reactor, a reactor cyclone system, a moving bed filtration system, a fluidized bed combustor, and a combustor cyclone system. Again, cyclone systems may include more than one cyclone if needed to meet certain operating objectives. Transferring of solids between vessels in the media recirculation loop, the solids each optionally utilizing different atmospheres, are generally done by either L-Valves or loop seals. The overall pressure balance drives the circulation of the solids in this stage.

Figure 2:
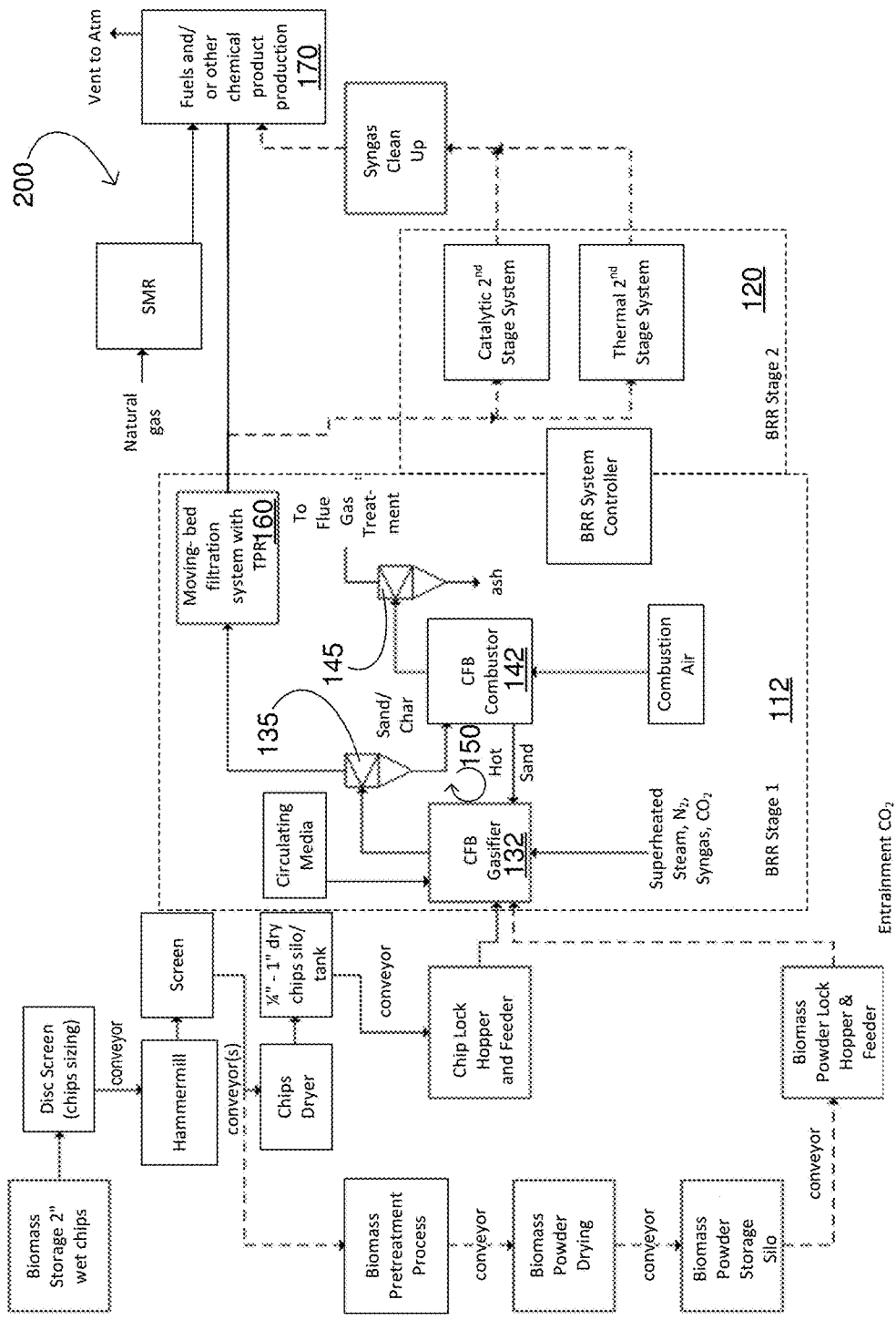
FIG. 2 illustrates a diagram of an integrated plant for generating syngas with at least a two-stage bio-reforming reactor including a first stage having a first first-stage configuration interconnected with a second stage in accordance with some embodiments.

FIG. 2 illustrates a diagram of an integrated plant 200 for generating syngas with at least a two-stage bio-reforming reactor including a first stage 112 having a first first-stage configuration interconnected with the second stage 120 in accordance with some embodiments.

As shown, the first stage 112 of FIG. 2 differs from the first stage 110 of FIG. 1 in that i) the gasifier 130 of FIG. 1 is a circulating fluidized-bed gasifier 132 in FIG. 2 and ii) the combustor 140 of FIG. 1 is a circulating fluidized-bed combustor 142 in FIG. 2. Such gasifiers and combustors are discussed in further detail below. In addition, in the first first-stage configuration, makeup media is added to the media recirculation loop 150 by way of at least the one or more media inputs of the gasifier configured to receive the media. That said, as shown in FIG. 1, makeup media can also be added to the first-stage by way of by way of the one or more media inputs of the combustor, the moving-bed filtration system, or both.

Figure 3:
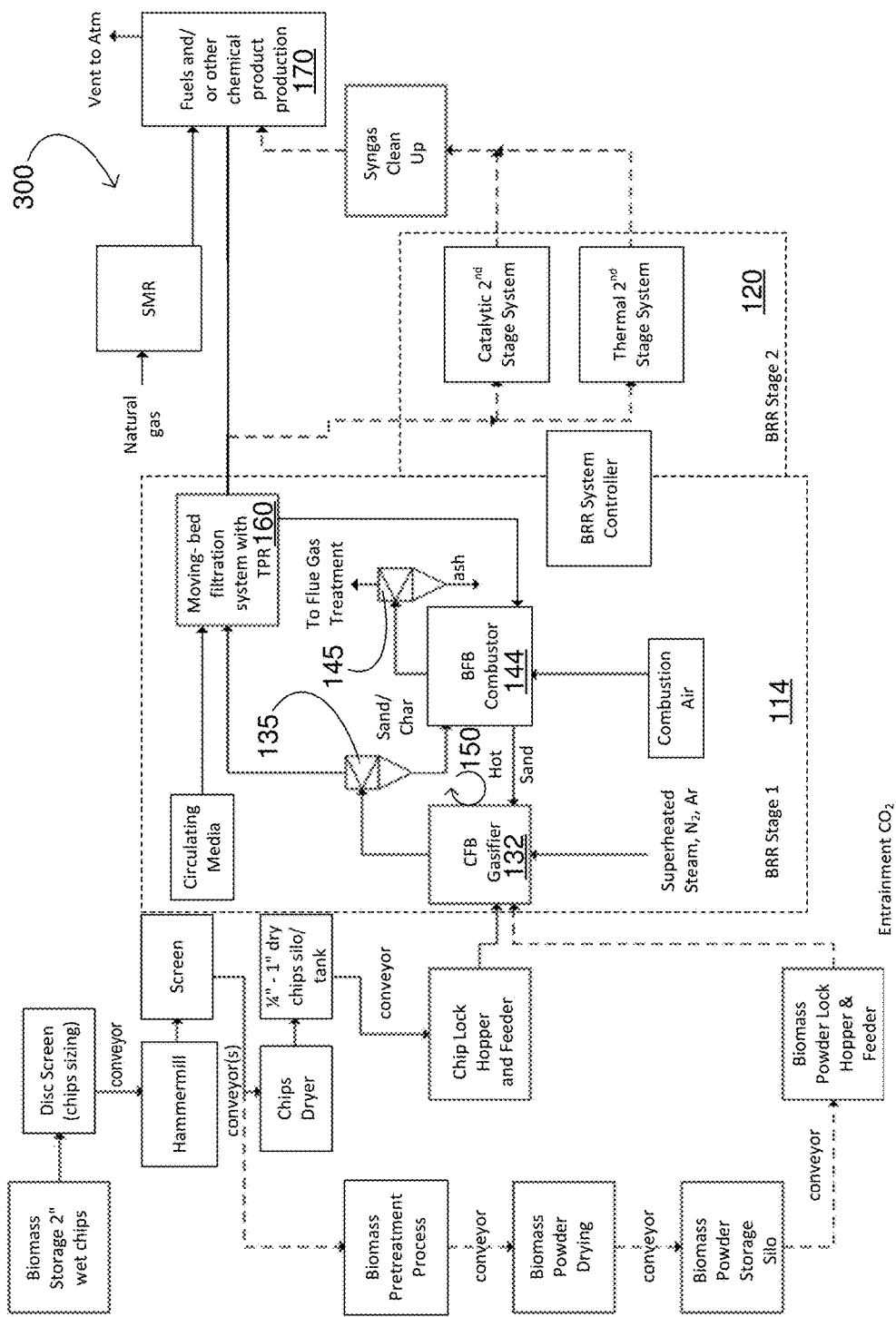
FIG. 3 illustrates a diagram of an integrated plant for generating syngas with at least a two-stage bio-reforming reactor including a first stage having a second first-stage configuration interconnected with a second stage in accordance with some embodiments.

FIG. 3 illustrates a diagram of an integrated plant 300 for generating syngas with at least a two-stage bio-reforming reactor including a first stage 114 having a second first-stage configuration interconnected with the second stage 120 in accordance with some embodiments.

As shown, the first stage 114 of FIG. 3 differs from the first stage 110 of FIG. 1 in that i) the gasifier 130 of FIG. 1 is a circulating fluidized-bed gasifier 132 in FIG. 3 and ii) the combustor 140 of FIG. 1 is a bubbling fluidized-bed combustor 144 in FIG. 3. Again, such gasifiers and combustors are discussed in further detail below. At least one advantage of the second first-stage configuration is that the amount of media (e.g., sand) loss is much less and controllable in the combustor cyclone system 142. In addition, in the second first-stage configuration, while makeup media can be added directly to the media recirculation loop 150 by way of the one or more media inputs of the combustor configured to receive the media, the makeup media is instead indirectly added to the media recirculation loop by way of at least one or more media inputs of the moving-bed filtration system configured to receive the media. The moving-bed filtration system, which can include a TPR as discussed in further detail below, is configured to then provide the makeup media to the combustor in a stream of the media including a reduced amount of heavier tars than a stream of the reaction products including the tars from the gasifier. That said, as shown in FIG. 1, makeup media can also be directly added to the first-stage by way of by way of the one or more media inputs of the gasifier, the moving-bed filtration system, or both.

Reactors

The reactor section can be a circulating fluidized bed reactor or a bubbling fluidized bed reactor or combinations of these, wherein the biomass, which is at ambient temperature or higher, contacts a mixture of fluidization gases (primarily steam) and high temperature circulating media. This media may be composed of any number of minerals (naturally occurring or synthetic), and/or catalysts and adsorbents (again naturally occurring or synthetic). The biomass may be injected at one or more locations in the lower section of the reactor. The hot circulating media may also be returned to the reactor at one or more locations in the lower section of the reactor.

The circulating media will consist of one or more of the following materials: silica-based sand, olivine, ilmenite, dolomite, zeolite catalytic material, sulfur-adsorbing minerals such as magnesium spinels, magnesium oxide, and ash. The circulating media serves several functions including heat transfer enabling the chemical volatilization and thermal cracking of the biomass, catalytic reaction of the gaseous species evolved from the biomass, adsorption of gaseous sulfur compounds generated and depression or increase of ash and sand melting/fusion temperature. The particle size of the circulating media will average from 150 microns to 800 microns such as 400-800 microns for moving the media through the moving-bed filtration system with a minimal fluidization velocity of about 0.5 ft/s and preferably about 1 ft/s. A maximum char to media ratio of about 2 wt % and preferably about 1.4 wt %.

The primary reaction products from the reactor are CO, $CO_2$, $H_2$, $CH_4$, light hydrocarbons (primarily $C_2$ and $C_3$ olefins, paraffins and some acetylene), and tars which consist of BTX (benzene, toluene and xylenes), naphthalene compounds, and multi-ring condensed aromatics (with and without alkyl sidechains). Unreacted biomass exits the system as char—a combination of carbonaceous species and ash. The circulating media will also be "coated" with heavy hydrocarbons or coke-like materials.

In at least one operating regime of the first stage of the bio-reforming reactor, the operating regime includes reacting the biomass in the gasifier (i) at a temperature of 700-1000° C., (ii) at a pressure of 20-300 psig, (iii) with a steam to biomass ratio (weight basis) from 0.5:1 up to 1.5:1 depending upon a type of the biomass, its moisture content, and operating objectives, (iv) with a media to biomass circulation rates from 15:1 to 60:1, and (v) for a residence time of 0.5-30 seconds to cause the set of chemical reactions in the biomass to produce the reaction products of constituent gases, tars, chars, and other components. The range of fluidization velocities in the system will range from 0.2 ft/sec near the inlet to over 50 ft/sec at the outlet of the reactor section. The velocities within each section of the reactor will vary by section. For example, in a mix pot section of fluidized bed/riser combination the velocities will range from 2-10 ft/sec, such as 7-10 ft/sec, while in the riser section the velocities will range from 20-50 ft/sec, such as 20-30 ft/s or 27-40 ft/s.

Incoming fluidization gases may consist of one or more of the following gases: steam, nitrogen, syngas, and $CO_2$. Some of this fluidization gas will be injected through a gas sparger located near the bottom of the lower section whereas some of it will be injected with the biomass to assist in feeding the biomass into the reactor. Fluidization gases injected into the reactor contribute less than 50% to the velocity of the gas moving up the reactor. The rest is provided by the volatilization of the biomass feed. In an embodiment, Fluidization gases injected into the reactor contribute less than 30% to the velocity of the gas moving up the reactor.

Internals such as bubble-breakers, baffles and feed distributors may be included in some sections of the reactor to ensure smooth flow and good mixing of the media and biomass. Again, the need for these will be dependent on the size of the reactor and the type and quality of the biomass. The equipment will be refractory lined for both temperature control and protection of the metal pressure vessel so that the amount of expensive, exotic metallurgy required for the BRR system can be minimized. This refractory lining may be multi-layer with heat protection and hard-faced or erosion protective layers.

Biomass ranging in size from >1 mm to over 2 inches will be fed into the system via a feed chute or gravity chute with optional fluidization gas assist to increase the velocity and dispersion in the reactor. Another option for feeding the biomass is to use a cooled screw feeder to mechanically transport the biomass into the bed. Design constraints such as size of the reactor mix pot, temperature in the mix pot and the amount and type of biomass to be fed will be important in choosing which option is best. A third option exists for "powdered" biomass (less than 1 mm average particle diameter)—gas phase conveying of the biomass into the reactor. The biomass can be fed with an inherent moisture up to 50% or dried biomass with as low as 5% moisture content may be fed. The type of biomass, plant energy balance needs and tradeoffs of capital versus operating costs will determine the optimal moisture content of the feed. The type of biomass will also determine whether it can be fed as "chunks" or powder.

Conversion of biomass in the reactor section may range from as low as 40% of the incoming carbon by weight to as high as 90 wt % of the incoming carbon. This means the char content that ends being fuel for the combustor will be in the 10-60% range. In some cases, this will require supplemental fuel for the entire Stage 1 system to remain in thermal balance. See Combustor description for more on this.

Reactor Cyclone System

The gases and solids leaving the reactor will pass through a primary cyclone system. The design of this cyclone system and its solids loading will depend on whether the reactor is being operated as a bubbling fluidized bed or the top section is operated like a circulating fluidized bed. In the bubbling fluidized bed reactor, only fines (~<100 microns) will be carried to the cyclone system as they will be elutriated from the bed. These fines will be discharged from the system for waste disposal. In the circulating fluidized bed or riser configuration, the cyclone system will include one or more heavily loaded cyclones. In this case the solids will be discharged from a cyclone dip leg into the combustor section of the first stage. The gas in both cases will be discharged to the tar pre-former ("TPR") unit wherein residual fines and soot are filtered out and unstable tars and soot precursors are reduced (more about the TPR later). Solids separation efficiency for the cyclone system is designed to be >99.99% for particles <50 microns in size in either case.

A loop seal will be used to ensure the safe injection of solids from the reactor cyclone system into the combustor and ensure that gases from the combustor cannot mix with reactor product (raw syngas).

Combustor and Combustor Cyclone System

The solids being discharged from the reactor cyclone system into the combustor in the circulating bed configuration will contain a mixture of circulating media, char (unreacted carbon plus ash) and any foreign matter (such as dirt) brought in with the biomass. The unreacted carbon will provide the primary source of fuel for the combustor. The combustor is supplied with air or oxygen enriched air to burn the unreacted char to provide this heat. Supplemental fuel such as natural gas, biogas, or other unwanted or recycled hydrocarbon-containing streams may be burned in the combustor in some configurations to provide heat for the reactor if the char content is low enough that sufficient heat can't be provided by it alone. The combustor will operate approximately 100-300 F hotter than the reactor to provide sufficient heat to drive the endothermic reactions in the reactor. The temperature of the combustor is limited by the temperature of the ash and solids fusion or softening temperature so as to avoid clinker formation or defluidizing the media bed.

The combustor may be operated as a bubbling fluidized bed, a circulating fluidized bed or some combination of thereof. In the bubbling bed configuration, fines are elutriated from the bed and separated from the gas via the combustor cyclone system and captured for disposal. Cyclone system efficiency in this case will be >99.99%. Additional cyclones may optionally be used to capture any remaining fines before discharging the hot flue gas to the expander where work is extracted to compress the incoming combustion air.

In the case of the bubbling fluidized bed, solids are transferred from the combustor through a standpipe and L-valve into the reactor. The entry for this standpipe may be through the bottom of the bed, an overflow weir within the bed or an outlet pipe near the top of the bed. Equipment arrangement and pressure balance for the specifically sized system will determine the best method for this.

In the circulating bed configuration, the entire bed is sent through the cyclone system and captured solids sent into the reactor section. Cyclone system efficiency in this case will be on the order of 98-99% capture of the circulating solids. In this case, a cyclone dip leg acts as the standpipe and the solids are transferred into the reactor section via an L-valve. Optionally, an elutriation vessel may be installed between the combustor cyclone dip leg and the L-valve stand pipe to remove fines from the system. The remaining solids and gas stream will be sent to any required additional cyclones where the mixed fines and ash stream are captured and sent for disposal. The hot flue gas will be sent to the expander/compressor set as cited above.

The combustor will have an outlet for removing circulating media from the Stage 1 system. This might be required to remove clinkers or to remove media because of excess build-up of ash or foreign matter brought into the system with the biomass. Ash content of biomass may be less than 1% in the case of wood chips but could be greater than 15% as in the case of rice hulls.

Tar Pre-Reformer

The gas coming from the reactor cyclone system contains a small amount of solids, 0.05-10 wt %, which must be removed from the system before entering Stage 2 of the BRR system. Typical industry practice in this case has been to use a hot gas filter. These are fairly expensive and difficult to operate and maintain. A moving bed filtration system has been developed that is cheaper to build, simple to operate and easy to maintain. It also serves another very important purpose for this application. It uses a slipstream of the hot circulating media to provide additional contact time for the raw syngas to further reduce the amount of tars and soot precursors before the raw biosyngas is sent to the Stage 2 reactor. Besides applications such as we are using it for producing chemical grade syngas, it also has application for cleaning syngas prior to use in combustion applications for heat or power generation. There are several options for implementing this combination reactor and moving bed filtration system.

Figure 6A:
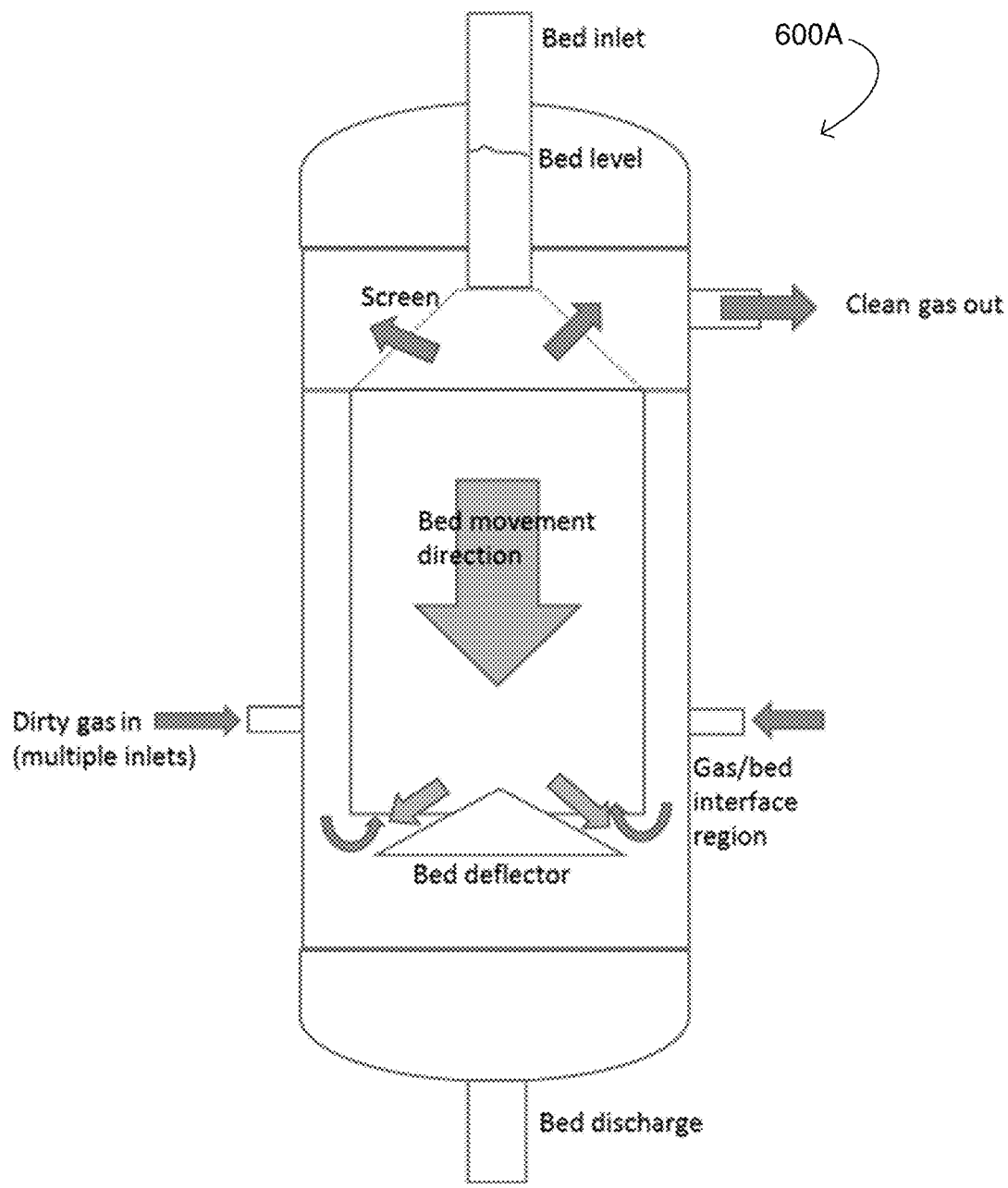
FIG. 6A illustrates a diagram of a moving-bed filtration system configured for a counter-current flow in accordance with some embodiments.

FIG. 6A illustrates a diagram of a moving-bed filtration system 600A configured for a counter-current flow in accordance with some embodiments.

As shown, the moving-bed filtration system 600A can be configured for a counter-current flow in which the media is fed into a top of the moving-bed filtration system, down through a center of the moving-bed filtration system, and discharged from a bottom of the moving-bed filtration system while the stream of the reaction products including the tars from the gasifier are fed into the bottom of the moving-bed filtration system, up through the center of the moving-bed filtration system, and discharged in a cleaned state from the top of the moving-bed filtration system. As such, the gas can be injected counter-currently to the moving bed of solids (moving down the bed due to gravity) such that gas moves up the bed. The captured solids (fine particulates and soot) exit with the filtering media and are injected into the combustor.

Figure 6B:
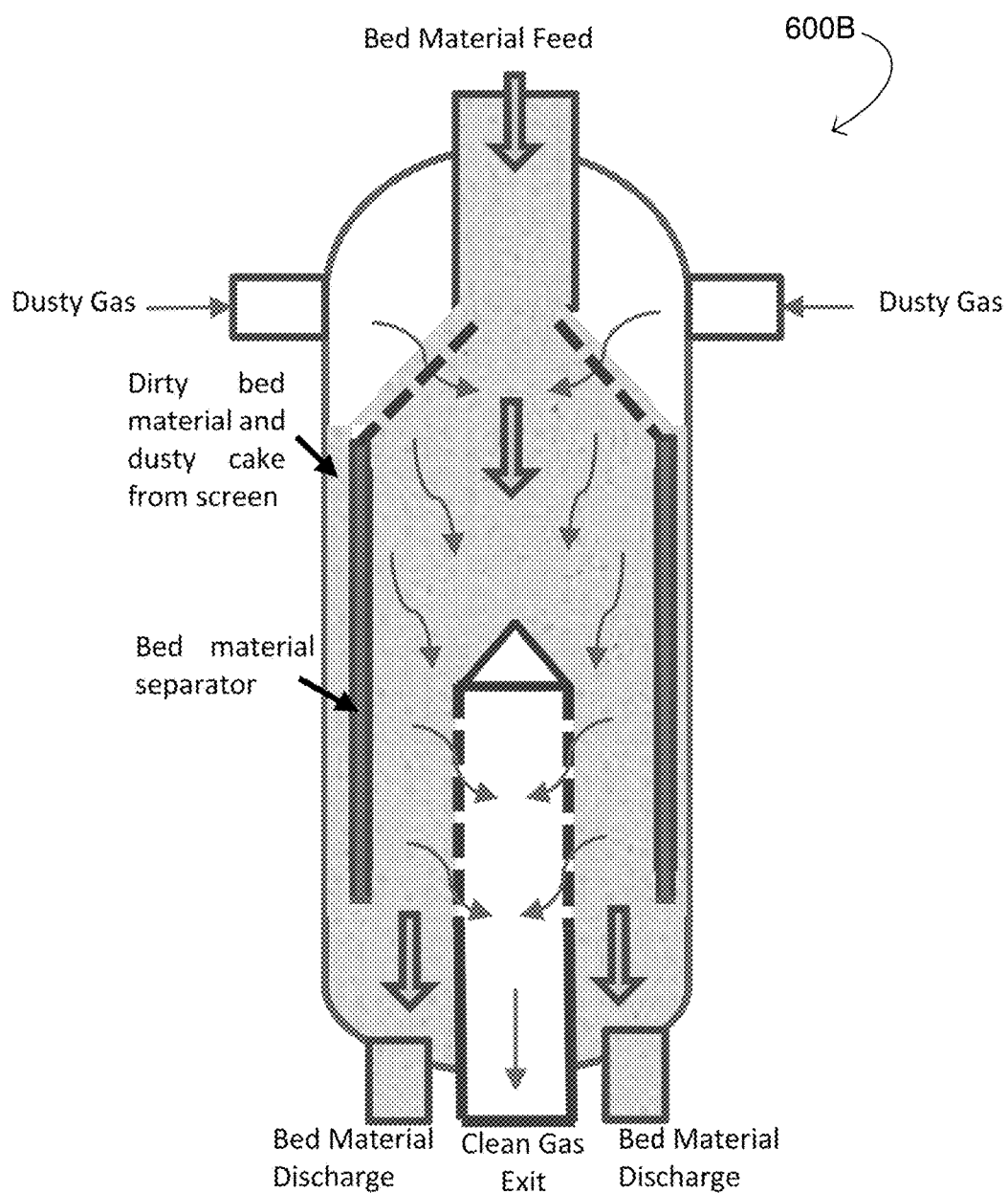
FIG. 6B illustrates a diagram of a moving-bed filtration system configured for a co-current flow in accordance with some embodiments.

FIG. 6B illustrates a diagram of a moving-bed filtration system 600B configured for a co-current flow in accordance with some embodiments.

The moving-bed filtration system 600B can be configured for a co-current flow in which the media is fed into the top of the moving-bed filtration system, down through the center of the moving-bed filtration system, and discharged from the bottom of the moving-bed filtration system while the stream of the reaction products including the tars from the gasifier is fed into the top of the moving-bed filtration system, down through the center of the moving-bed filtration system, and discharged in a clean state from the bottom of the moving-bed filtration system. As such, the gas can be injected at the top of the bed concurrently with the down-flowing solids, which is a means for separation separating the cleaned gas from the solids before discharging the solids to the combustor.

Figure 6C:
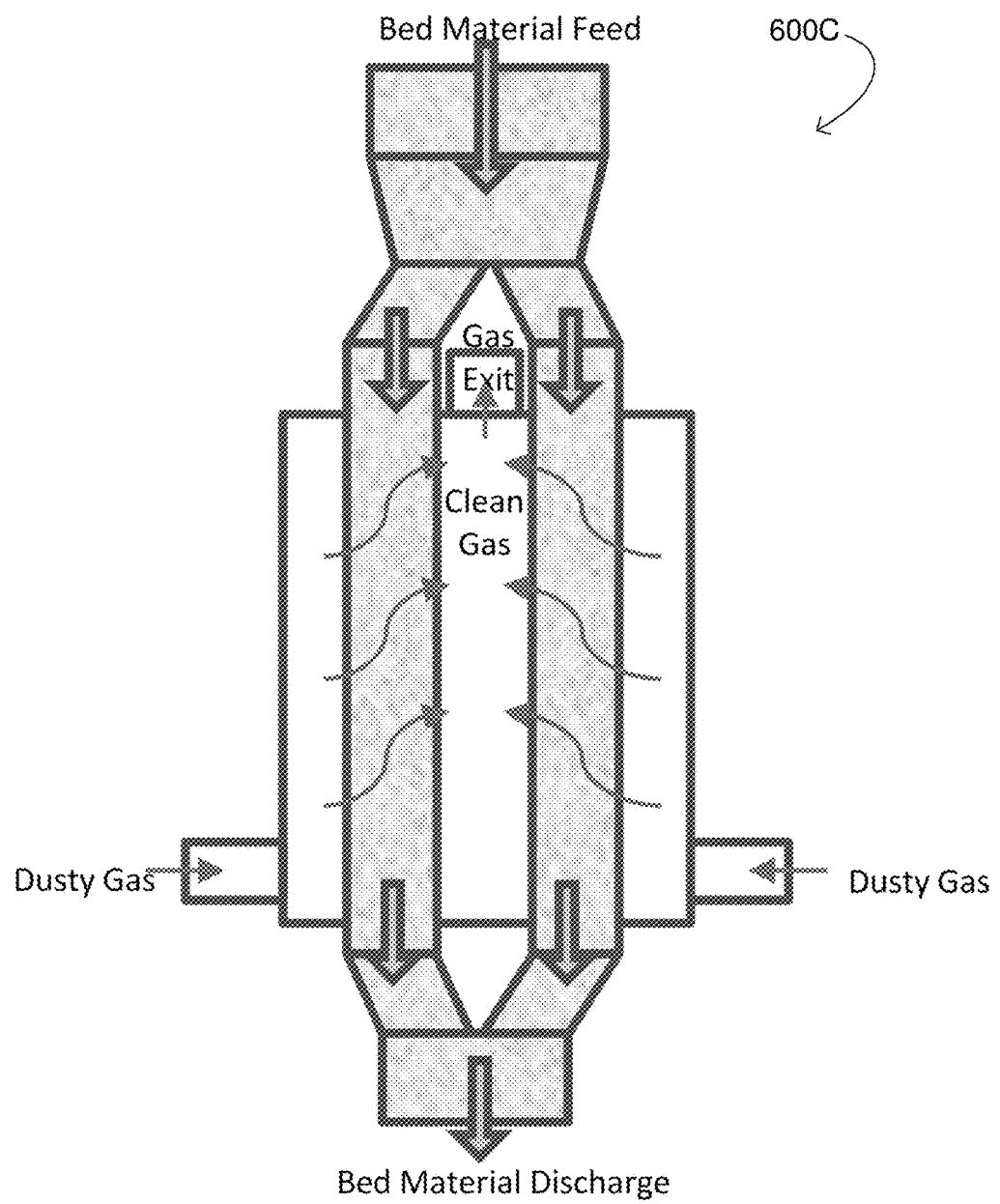
FIG. 6C illustrates a diagram of a moving-bed filtration system configured for a radial flow in accordance with some embodiments.

FIG. 6C illustrates a diagram of a moving-bed filtration system 600C configured for a radial flow in accordance with some embodiments.

The moving-bed filtration system 600C can be configured for a radial flow in which the media is fed into a top of the moving-bed filtration system, down through an inner cylindrical shell of the moving-bed filtration system, and discharged from a bottom of the moving-bed filtration system while the stream of the reaction products including the tars from the gasifier is fed into the bottom of the moving-bed filtration system, up through an outer cylindrical shell of the moving-bed filtration system, radially through the inner cylindrical shell of the moving-bed filtration system to central chamber of the moving-bed filtration system, and discharged in a cleaned state from the top of the moving-bed filtration system. That is, the gas can be injected into the media through an outer annulus and removed through an inner tube. Alternatively, while keeping the media feed and flow the same as the foregoing, the stream of the reaction products including the tars from the gasifier is fed into the bottom of the moving-bed filtration system, up through the central chamber of the moving-bed filtration system, radially through the inner cylindrical shell of the moving-bed filtration system to the outer cylindrical shell of the moving-bed filtration system, and discharged in a cleaned state from the top of the moving-bed filtration system. That is, the gas can be injected into the media from the inner tube in the center of the bed and removed through the outer annulus, which is a preferred mode of operation. In either case, the gas can be radially injected into the down-flowing filter media—or in a crossflow configuration.

The source of the filtration media is taking a slipstream, 1-10% of the hot circulating media from the combustor and putting it in the top of the TPR. The moving bed of media flows down the TPR as a dense (non-fluidized) bed. The media, which will contain coke, soot and some residual tar will exit the TPR and be injected into the combustor.

The essentially solids-free raw biosyngas will leave the TPR, heading to Stage 2 of the BRR system. One option is to also an additional cyclone at the gas outlet of the TPR to remove any trace solids that may not have been captured in the TPR to prevent solids from getting to Stage 2. Whether this is required or not will depend on the type of biomass being processed as well as the amount of soot and fines generated in the Stage 1 system. Another factor will be the elutriation efficiency of the clean media source feeding the TPR.

Additional Discussion

The following drawings and text describe additional aspects of different embodiments of the design.

FIG. 1 illustrates a diagram of an embodiment of integrated plant with an interconnected set of two or more stages of reactors to form a bio-reforming reactor that generates syngas.

The integrated plant may have an interconnected set of two or more stages 110, 120 of reactors. An example first stage reactor 110 is meant to cause the devolatilization of woody biomass into its constituent gases, tars, chars, ash, and other components. In the first stage, devolatilization of woody biomass occurs by chemically bio-reforming or decomposing the biomass via a gasification of a steam-based reaction where the steam, as the oxidant, at a given temperature chemically decomposes the complex chains of molecules of the biomass into smaller molecules composed of 1) solids, such as char (unreacted carbon and ash), as well as 2) gases, such as hydrogen ($H_2$), carbon monoxide (CO), carbon dioxide $CO_2$, methane ($CH_4$), etc. Thus, a decomposition reaction of the biomass through steam gasification occurs chemically, which may be referred to as bio-reforming. The second stage 120 of the reactor is meant to perform further clean up the syngas to make the raw syngas from the first stage 110 into chemical grade syngas by further cracking the tars and/or excess methane into their constituent molecules so that the resultant syngas stream can be used in other chemical reactions rather than just being a source of fuel for burning.

The integrated plant starting from biomass (dried or not dried) may feed a two-stage bio-reforming reactor ("BRR") 110, 120. The bio-reforming reactor produces a chemical grade syngas to produce fuels or other chemicals such as Methanol ("MeOH"), Methanol to Gasoline ("MTG"), High Temperature Fischer Tropsch process ("HTFT"), Low-Temperature Fischer-Tropsch process ("LTFT"), etc. A Steam Methane Reactor may or may not be included with the integrated plant in order to supply extra hydrogen when combined with the syngas from the bio-reforming reactor. Biomass could be any non-food source biomass such as wood, sugarcane, bamboo, sawgrass, bagasse, palm empty fruit basket, corn stover, etc. In an embodiment, a low sulfur content woody biomass is chosen as the source biomass. In an embodiment, a combination of these biomass sources is chosen as can be supplied locally to the integrated plant.

The biomass feed system is configured to supply the biomass to one or more biomass inputs into the fluidized bed reactor in the first stage 110. The biomass feed system further includes any of 1) a rotary valve associated with a pressurized lock hopper system, 2) a rotary valve from a non-pressurized hopper, 3) a screw feeder system, or 4) combination of the above. A variety of sizes of the biomass such as dimensions of small fine particles, less than 500 microns, and/or chunks, such as an ¾ inch or half-inch or ¼ inch long chip of wood, may be fed by the above variety of feeding mechanisms (e.g., a screw-type feeding mechanism, a lock hopper mechanism, etc.).

The biomass feed system supplies the biomass across a pressure boundary from atmospheric to above the operating pressure within the fluidized bed reactor in the first stage 110. High pressure steam or gas and gravity are used to supply the biomass through the one or more biomass inputs across and out into the vessel of the fluidized bed reactor to prevent backpressure on the biomass feed system and obtain better mixing throughout the vessel.

As shown in either FIG. 2 or FIG. 3, first stage 110 of the bio-reforming reactor may include a circulating fluidized bed reactor that has one or more biomass inputs to supply the biomass from the biomass feed system, one or more steam inputs to feed heat-absorbing media, a vessel to circulate the heat-absorbing media, and has a sparger to input steam. The heat-absorbing media may include silica sand, ilmenite, olivine, dolomite, zeolite catalysts, and any combination of the five. In general, the biomass, steam, and heat-absorbing media circulate in the vessel/fluidized bed of the reactor. The first stage 110 is configured to cause a chemical devolatilization of the biomass into its reaction products of constituent gases, tars, chars, and other components, which exit through a reactor output from the first stage 110.

As shown in FIG. 3, the first stage 110 includes the circulating fluidized bed reactor coupled with a char combustor. Hot heat-absorbing media for fluidization (e.g., the silica sand or olivine) may be circulated between the circulating fluidized bed gasifier and the char combustor, providing most of the necessary heat to gasify the incoming biomass and utilizing the char produced in the circulating fluidized bed reactor. The char combustor could be a circulating fluidized bed reactor (riser configuration) as shown in FIG. 2 or a bubbling fluidized bed reactor as shown in FIG. 3. At least one advantage of the bubbling fluidized bed reactor is that the amount of media (e.g., sand) loss can be much less and controllable in a coupled combustor cyclone system. The char combustor is configured to heat and supply the circulating heat-absorbing media to the one or more media inputs into the circulating fluidized bed reactor. The reactor output from the first stage 110 couples to cyclone system having a cyclone with a dip leg that has an outlet to the bubbling fluidized bed char combustor. The char combustor may or may not have supplemental fuel added in the form of natural gas, propane, fuel gas, torch oil, kerosene, or additional biomass. The operating temperature of the char combustor will be about 100-150° C. above the temperature of the circulating fluidized bed reformer. The char combustor can have an outlet (return to the circulating fluidized bed reformer) for the circulating media either through a first stage 110 cyclone system in the case of the circulating fluidized bed combustor or an overflow (or underflow) port to a standpipe in the case of the bubbling bed combustor configuration.

The second stage reactor 120 of the bio-reforming reactor may contain a radiant heat reactor that either 1) operates at a high enough temperature such that no catalyst is needed to decompose the tars and excess methane in the syngas stream or 2) operates with a catalyst at a lower temperature and then occasionally rejuvenates the catalyst in the second stage 120.

The second stage 120 of the bio-reforming reactor has an input configured to receive a stream of some of the reaction products that includes 1) the constituent gases and 2) at least some of the tars as raw syngas, and then chemically reacts the raw syngas within a vessel of the second stage 120 to make the raw syngas from the first stage 110 into a chemical grade syngas by further cracking the tars, excess methane, or both into their constituent molecules so that a resultant syngas stream going out a reactor output of the second stage 120 can be used in other chemical reactions rather than just being a source of fuel for burning.

In an embodiment, the catalytic reactor in the second stage 120 removes a substantial amount of tars and methane remaining in the raw syngas. The catalytic reactor reacts with the raw syngas to create a resultant chemical grade synthesis gas that is substantially tar-free, (less than 100 ppm total tars including benzene and naphthalene and more likely less than 5 ppm) and with a methane content as low as 0.5% (dry basis) and certainly no higher than 10% (dry basis).

Going back to stage 1, a candle filter or a packed or moving bed with a TPR may be an exit component from stage 1 or an entry component into stage 2. The syngas from stage 1 may be sent to any of the candle filter, which could operate as high as 900° C.; an additional cyclone for dust removal; or the packed or moving bed of, for example, olivine, ilmenite, or dolomite, which could act as both a filter and a tar destroyer or a tar pre-reformer. If syngas from stage 1 goes through the candle filter, the integrated plant may still pass syngas to the olivine or dolomite bed for tar destruction. Tar destruction is important as any tar that passes on to stage 2 has potential to poison catalyst used in second stage, which can be costly if not addressed.

The interconnected set of two or more stages of reactors 110, 120 form a bio-reforming reactor that generates syngas for any of 1) a methanol synthesis reactor, 2) a Methanol to Gasoline reactor train process, 3) a low-temperature Fischer-Tropsch reactor train, 4) another transportation fuel process, and 5) any combination of these, that use syngas derived from biomass in the bio-reforming reactor.

FIG. 4 illustrates a diagram of a first stage reactor 400 including the circulating fluidized bed reactor coupled with a char combustor.

The circulating fluidized bed reactor has multiple sections forming a shape and an operation of the circulating fluidized bed reactor. The circulating fluidized bed reactor may have a bottom section 414 and a mixing pot section 416 of the vessel that are cylindrical in shape. The mixing pot section 416 then comes up to a necking portion 418 of the vessel that is smaller in diameter than the mixing pot section 416. The necking portion 418 then goes to a top riser section 420, which includes the reactor output of the first stage. In an embodiment, the cylindrical shaped bottom section 414 of the vessel to the necking portion 418 forms a mixing pot section 416 with circumference and/or width dimensions that are substantially greater than the circumference of the riser section 420. The bottom section 414 has the sparger to distribute high-temperature and high-pressure steam in the circulating fluidized bed reactor at a velocity of about 2 feet/second and between 50 to 300 pounds per square inch. The sparger is located at or near the bottom of the vessel. The high-temperature and high-pressure steam from the sparger may supply some of the energy needed to decompose the biomass as well as create an upward force to carry the biomass and circulating heat-absorbing media up through the vessel.

In an embodiment, the sparger cooperates with an associated bubble breaker, such as cross hatched metal, to make smaller bubbles of gas to better carry the solids of the circulating media and biomass upward. The bubble breakers also prevent slugging and provide smoother circulation.

The biomass inputs to supply biomass are located in the mixing pot section to feed the biomass toward the bottom of the vessel, where the biomass is mixed with superheated fluidization gases and heat-absorbing media. The feed point of the biomass inputs to supply biomass is far enough from the bottom section of the vessel to ensure the biomass readily falls from the biomass inputs into the vessel from a great enough height that the biomass cannot get close to physically building up from the bottom to block the entering biomass; and thus, a location of the biomass inputs in the vessel eliminates a need to have a seal for the biomass inputs against solid biomass back flow. The design may have at least 3-foot drop on the gas feed line to taps/aeration points and also the gasifier/reactor and the char combustor plenums. This 3-foot rise is a very effective seal against solid back flow. This drop and rise varies with specific size and geometry of vessel.

The one or more biomass inputs supply the biomass supply biomass chunks and/or particles at a higher pressure than in the vessel in order to distribute the biomass downward and across the vessel. The higher injection pressure and gravity cause the biomass chunks to be injected in the vessel. As a counter force, the steam from the sparger, superheated fluidization gases (steam, $N_2$, Argon), and a stream of the heat-absorbing media from the one or more media inputs both gasify and push up falling chunks and particles of the biomass upward and in a radial direction in the vessel. The velocity of the steam, media, and gases as well as the pressure pushes up the falling chunks and particles of biomass upward into the circulating fluidized bed reactor vessel. Using the latent heat provided by the steam, media, and gases, the biomass is converted to syngas by a decomposition reaction with steam as the chunks or particles of biomass rise in the circulating fluidized bed gasifier. The high temperature and high-pressure of the steam and the heat-absorbing media starts the devolatilizing of the biomass, which causes localized turbulent flow of gases around each biomass chunk. The turbulent flow of gases creates better mixing and better reaction with the injected biomass.

The circulating fluidized bed may have different velocities flowing through the vessel, which also causes a good amount of turbulence for the biomass flowing with the circulating solid media. The velocity of the biomass flowing increases as the size of the chunk of biomass decreases via the decomposition of its larger complex molecules into smaller solid molecules and gaseous molecules. The devolatilization and decomposition of the biomass substantially increases the gas volume and therefore gas velocity of the system.

In an embodiment, the velocity flow of the biomass and/or heat-absorbing media in the bottom section 416 is 2-3 feet/second. The velocity flow of the biomass and/or heat-absorbing media in the mixing pot section 416 is between 2-6 feet/second in the circulating fluidized bed reactor based on a shape and dimensions of the vessel. The velocity flow of the biomass and its devolatilized gases and solids at a start of the necking transition section is up to 5-10 feet per second based on the shape and dimensions of the vessel in this section. The velocity flow of the biomass and its devolatilized gases and solids at the start of the necking transition section may be, for example, 6 feet per second. The velocity flow of the biomass and its devolatilized gases and solids within the riser section 420 speeds up to 10-20 feet per second. The velocity flow of the biomass and its devolatilized gases and solids at an exit of the riser section 420 is greater than 15 feet per second, and typically 20 feet per second, based on the shape and dimensions of the vessel in this section.

The velocity flows in the riser section 420 have a residence time of 1-2 seconds due to a rate of the velocity flow of the biomass, its devolatilized gases and solids, and the heat-absorbing media, as well as the designed dimensions and shape of the riser section 420. The lower velocities and bigger volume of the mixing pot section 416 allow for an on average residence time of 2-3 seconds within the mixing pot section 416 due to a rate of the velocity flow of the biomass, its devolatilized gases and solids, and the heat-absorbing media, as well as the designed dimensions and shape of the mixing pot section 416. This residence time is significantly longer than prior techniques. The longer residence time creates better mixing of the chunks of biomass with the circulating media to chemically react and decompose the biomass into its constituent solids and gases. Additionally, some chemical reactions need a longer chemical reaction time to assist in the prevention of forming of certain tars. Also, the longer residence time assists in increasing the yield of fully converting the woody biomass into its constituent solids, such as C (ash), and gases such as CO, $CO_2$, $CH_4$, and $H_2$.

The angular necking section 418 of the circulating fluidized bed reactor reflects and turns some of the heat-absorbing media, gases, and not fully-decomposed solid biomass on outside edges of the necking section 418 back down into the circulating fluidized bed in the mixing pot section 416, which causes more turbulence as well as a better distribution of the biomass inside the vessel. Note, an angle of the necking section 418 from the mixing pot section 416 to the riser section 420 controls an amount of turbulence with the reflected back heat-absorbing media, gases, and not fully decomposed solid biomass into the mixing pot section 416 portion of the vessel. The more turbulence the better the mixing of the heat-absorbing media and biomass, as well as a better distribution of the biomass throughout all of the circulating media in the lower portions of the circulating fluidized bed reactor vessel. The ratio of circulating media to biomass feed will be, for example, on the order of 20:1 up to 60:1 depending on operating objectives (desired reaction temperature, product slate, type and moisture content of biomass, temperature of incoming sand or olivine, etc.).

As discussed, the circulating fluidized bed reformer may have lower velocities at the bottom section 414 of the reactor, near the feed inlet, provided primarily by steam (and perhaps supplemental recycled syngas or $CO_2$) and will quickly rise as the woody biomass reacts and/or changes are made to the reactor diameter. The circulating fluidized bed reformer also may or may not contain internals intended to help with smoother fluidization and better mixing of the incoming sand or olivine and biomass. In an embodiment, an internal portion of the vessel does have the one or more internal mixing baffles to assist with mixing of the heat-absorbing media and biomass. Note, in the bubbling fluid bed version of the combustor internal mixing baffles may also be used.

As discussed, the circulating fluidized bed reactor has multiple sections forming a shape and an operation of the circulating fluidized bed reactor. The circulating fluidized bed gasifier has the sparger to distribute high-temperature and high-pressure steam in a bottom section 414 of the circulating fluidized bed reactor. The circulating fluidized bed reactor is configured to operate in a temperature regime from 750 degrees C. to 1000° C. and an operating pressure is configured to be from 20 pounds per square inch up to 300 pounds per square inch with a typical value of 125 pounds per square inch. The steam and heated heat-absorbing media create this operating temperature in the vessel, which can also be supplemented with an external heat source such as a gas-fired burner coupled to the vessel. The reason for the ranges of the operating conditions for the circulating fluidized bed reactor are biomass type, ash fusion temperature, yield patterns, and downstream performance requirements.

In another example embodiment, the superficial gas velocities in a top riser section 420 are configured to be greater than 19 feet/second based on a shape and dimensions in this section of the vessel while the velocities in a mixing pot section 416 will range from 2-6 feet/second based on a shape and dimensions in this section of the vessel. The mixing pot section 416 is located between the bottom section 414 and top riser section 420. The steam from any of 1) the sparger, 2) the media inputs for the heat-absorbing media, and 3) the biomass inputs for the biomass combine to reform the biomass at total steam to biomass ratio ranging from 0.25:1 up to 1:1. The actual value will depend upon the biomass, its moisture content and operating objectives (yields, etc.). The steam and hot solid media reform the biomass in the circulating fluidized bed gasifier.

In the riser section 420, raw syngas including tars and methane, unreacted portions of solid biomass, ash from reacted portions of the biomass, and circulating media exit the riser section 420 of the circulating fluidized bed reactor.

The primary cyclone system is coupled to the reactor output from the first stage in a riser section 420 of the circulating fluidized bed reactor. The top necking portion 418 of the circulating fluidized bed feeds into a top riser section 420 that then feeds into a primary cyclone system that is very efficient, 99.99% efficiency at removing solid particles and pieces from the syngas. The primary cyclone system is heavily loaded to operate at very high solids recovery efficiency in excess of 99%, and in most cases greater than 99.9%. In an embodiment, the cyclone system has an efficiency 99.995%. The primary cyclone system that is very efficient in separating solid particles including char and the solid circulating heat-absorbing media routes the solid particles toward the char combustor. The primary cyclone system also routes gases from the stream of the reaction products toward the input of the second stage of the bio-reforming reactor. Thus, the output of the top portion of the primary cyclone system is raw syngas that is fed to the second stage. The output of the bottom portion of the primary cyclone system is solid particles and pieces fed to the char combustor. Gravity pulls the solid particles and pieces, including heat-absorbing media, ash, char, and other solids, down from the bottom of the primary cyclone system through a loop seal into the char combustor.

Note, the char of the biomass, ash, and media (sand or olivine) stream is fed to the bubbling fluidized bed char combustor in order to regenerate and reheat the fluidization media.

Note, another type of combustor such as a circulating fluidized bed char combustor may be used. Also, another type of reactor may be used in the first stage such as a bubbling fluidized bed reactor, a radiant thermal reactor, a circulating fluidized bed reformer with a straight riser, or a fast-fluidized bed with a riser on top. Note, in an embodiment olivine is used as at least a portion of the heat-absorbing media. The olivine material (specifically the Magnesium Oxide ["MgO"] in olivine) as heat-absorbing media is for beneficial binding potassium out of the reaction products and minimizing clinker formation.

Note, tail/waste gases from other parts of the integrated plant, including methane from a downstream methanol stage if used, may be routed in a loop to the char combustor and used as supplemental fuel in the combustor to heat the heat-absorbing media. The char and fuel gases are combusted to heat the heat-absorbing media. Natural gas may be used as supplemental fuel in the combustor to provide the balance of gasification heat required. The combustor is operated at gas velocities that allow the smaller/lighter ash particles to be separated from the sand or olivine and recovered in flue gas solids removal systems (downstream of a recycle combustor cyclone or cyclone system). Hot, regenerated sand or olivine is returned to the gasifier/circulating fluidized bed reactor via an L-valve.

In an embodiment of the circulating fluidized bed version of the combustor, a recycle cyclone or a cyclone system of one or more recycle clones is coupled to the char combustor and is configured to operate at less than maximal efficiency from as low as 75% and no higher than 99%. This is to ensure that a bulk of the heat-absorbing media is returned to the char combustor but will allow the lighter ash particles to escape to the recycle cyclone system where the ash particles are removed from the integrated plant. The recycle cyclone system is the primary mode of exit for ash from the system (as well as attrited fines from the circulating media). A cyclone separator is a low efficiency cyclone separator that separates two solids such as the heavier circulation medium, such as sand or olivine, from the lighter particles of ash. In an embodiment of the bubbling fluidized bed version of the combustor, the cyclone system will be extremely high efficiency—greater than 99.99%.

For the circulating fluid media loop with stage 1 of the BRR and the char combustor, the design may use properly designed devices such as L-valves and loop seals to ensure a desired circulation rate with safe operation.

The heat-absorbing circulating media could be silica-based sand, olivine, ilmenite, or mixtures thereof. The integrated plant may also put in other additives with the circulating media such as catalysts (to reduce the tar and other heavy hydrocarbon yield, increase approach to water-gas shift equilibrium, sulfur getters, and other additives to raise the melting points of the ash and media).

The circulating fluidized bed reactor/biomass gasifier may be lined with refractory materials of both soft and hard refractory materials such as 2 inches of soft refractory insulation and 2 inches of hard refractory insulation. In an embodiment, the thickness of the hard face refractory insulation is adjusted to fit into nominal pipe and vessel size requirements. In another embodiment, what governs the refractory thickness and fit is the need to control temperature of the chosen metallurgy, erosion and chemical resistance of the refractory, etc.

FIG. 5 illustrates a diagram of an embodiment of a densely packed moving bed 535 coupled to the reactor in a first stage 500 via the primary cyclone system.

The densely packed moving bed 535 may be made of olivine, ilmenite, or dolomite that is similar in composition to circulating heat-absorbing media. The densely packed moving bed 535 is configured to act as both a dust filter and a tar destroyer from the raw syngas stream coming out from the reactor output of the first stage. The densely packed moving bed 435 is coupled to a gaseous output of the primary cyclone system coupled to the reactor output of the first stage. The densely packed moving bed 435 can also be coupled to a guardian cyclone (e.g., cyclone 536 of FIG. 5) or guardian cyclone system of one or more guardian cyclones designed to protect downstream catalyst in the second stage from getting poisoning. The tar destruction bed could operate adiabatically at 900° C. (temperature could drop to 800-850° C.) or isothermally with a mechanism for heating the bed—e.g. via a furnace or some oxygen addition. In an embodiment, the moving bed 535 is configured to operate adiabatically at 800° C. to 950° C. temperature. Tars heavier than benzene are chemically broken down into constituent gases in the raw syngas in the densely packed moving bed 535 in order to protect any downstream components from coating with soot.

In general, olivine is active for tar conversion at the decomposition conditions presented herein. Olivine is generally used in the gasifier as heat-absorbing media, due to its attrition resistance; however, it can also be applied separately downstream of the gasifier in the moving packed bed form as a guard bed/tar converter. Olivine performance for tar cracking activities can be very effective at these conditions. Regeneration of the Olivine packed moving bed 535 is accomplished by flowing the moving packed bed of Olivine with its collected dust and heavy tar residue into the packed bed of olivine and then into the char combustor to be joined and heated with the rest of the circulating olivine in the char combustor. In an embodiment, conversions—tars (heavier than benzene) may be 25-65%; benzene conversion may be 90%; light hydrocarbons conversion may be 0%; and methane conversion in the raw syngas may be 0%. Thus, the hot packed slow-moving bed 535 of olivine is operated at about 900 degrees C. to chemically break down the heavy sooting tars, such as polyaromatic hydrocarbons tars, in the raw syngas from the gasifier/reactor in the first stage. The hot packed slow-moving bed 535 of olivine, acts as a tar pre-reformer to substantially breaks down the heavy sooting tars to protect the downstream components from coating with soot.

Note, in order not to fluidize the moving bed, the apparent weight of the bed must exceed the pressure drop through the bed. Using an average olivine particle diameter of 550 microns, a GHSV (active bed length) of 3,000 v/v/hr, and an L/D of 0.385 ft/ft, a pressure drop of 4.1 pounds per square inch is estimated. Therefore, in an embodiment, a minimum densely packed bed level of seven feet (ft) is required above the outlet gas collector in order to keep the densely packed moving bed 535 from fluidizing.

In an embodiment, the moving bed may draw circulating media from the char combustor to act as the feed source for the densely packed bed and could be fed by a loop to the make-up insertion input into the moving bed.

In an embodiment, once the syngas has been processed to remove a substantial amount of heavy tars in the integrated plant, and then the syngas will be sent to the stage 2 system for destruction of the remaining tars and conversion of a substantial amount of the methane to synthesis gas in a catalytic reactor. This catalytic reactor may be packed with supported metal catalysts active for methane reforming and tar destruction. Typical metal catalysts include nickel oxide, precious metals, etc. as catalysts. In an embodiment, the catalytic reactor in the second stage may operate at 850-900° C. and have multiple tubes, each with the catalyst inside the vessel of the reactor while gas fired heaters supply heat for the chemical reactions inside the tubes. The reactor may be co-fed with sufficient superheated steam to increase the steam:carbon ratio of the catalytic reactor feed to, for example, 8 mol/mol. The syngas with light tars and methane enters the tubes with the catalyst and then this reforms the light hydrocarbons in their constituent molecules of $H_2$, CO, $CO_2$, etc.

The catalytic reactor in the second stage may operate at GHSV's ranging from 1000-20,000 inverse hours, most preferably in the 2,000-7,000 range. The temperature of operation would be 700-1000° C., most likely in the 800-900° C. range. The exact operating conditions would be a function of desired conversion, feed properties, and catalyst life. The tubular reactor system is installed in a fired furnace not unlike a Steam Methane Reformer furnace or ethylene furnace. The catalyst will require regeneration on some frequency to maintain activity. The regeneration is effected by mild oxidation of the carbon deposited on the catalyst, although steam or hydrogen regeneration in a reducing atmosphere can also be practiced.

The second stage of the BRR reduces the tars by cracking the tars out of the gas stream and does use a catalyst. The second stage reduces the methane percentage by steam-reforming the methane into smaller molecules such as CO, $CO_2$, and $H_2$. The resultant chemical grade synthesis gas will be substantially tar-free (less than 100 ppm total tars including benzene and naphthalene and more likely less than 5 ppm) with methane content as low as 2% (dry basis) and certainly no higher than 10%.

The output of the second stage is sent to a syngas cleanup section to remove additional trace contaminants from the syngas, such as sulfur, water, and potassium, and other trace contaminants before sending the chemical grade syngas to downstream chemical processes, selected from a methanol synthesis reactor, a Methanol to Gasoline reactor train process, a low-temperature Fischer-Tropsch reactor train, or another chemical process that uses the reaction syngas product derived from biomass in the bio-reforming reactor.

In an embodiment, a tubular reactor with an operating temperature over 1100 degrees C. can substantially crack all of the tars and methane without a catalyst. A tubular reactor with lower operating temperatures can also crack these molecules with the assist of a catalyst.

As part of the plant integration, some of the raw syngas may bypass the Stage 2 catalytic reformer so as to maintain a high calorific value as use for fuel gas in the rest of the plant. This will especially be true for those cases requiring higher greenhouse gas reduction or for those where natural gas is not readily available at reasonable cost. This fuel gas could be used for generating steam, firing furnaces, supplemental fuel to the char combustor, and other places where natural gas might typically be used. Also, beneficial carbon credits may be generated for using this raw syngas from the integrated plant over natural gas.

Referring back to FIG. 1, the integrated plant may have a biomass feed supply system, an interconnected set of two or more stages of reactors 110, 120 to form a bio-reforming reactor, a gas clean up section, a steam methane reformer in parallel with bio-reforming reactor, and any of a methanol synthesis reactor, a Methanol to Gasoline reactor train process, a high temperature Fischer-Tropsch reactor train, or another chemical process that uses the reaction syngas product derived from the decomposition in the bio-reforming reactor and syngas from the steam methane reformer.

In the biomass feed supply system, the biomass may be stored as chips. The conveyor may bring the chips of biomass over to a filter/screen that make sure that the chip size is within limits, such as underneath 2 inches of length of chip of biomass. After the screening of the chip size, the biomass chips may be fed to a size reduction step such as a Hammermill. The Hammermill may then feed the chips to second screen to make sure that the chip size is within limits, such as underneath ¾ inches of length of chip of biomass. A conveyor may bring the chips through the second screen to either 1) a chip dryer or 2) to a biomass pre-treatment process to make small fine particles of biomass, such as a steam explosion process. Chips going to the biomass pre-treatment process such as a steam explosion process are turned into fine moist particles of biomass magnitudes smaller in size than the chips. The moist fine moist particles of biomass go to a dryer system and become biomass in a dried powered form. The dried powdered form of biomass may be stored in a silo. The biomass may be stored as chips.

The moisture content of the biomass can range from say 3-5% to as high as 35%. The integrated plant may have drying options that can include flash dryers, rotary drum dryers, or belt dryers. The integrated plant may dry in a low oxygen atmosphere for safety reasons including prevention of fires as well as inert gases from other parts of the process can be re-used and integrated as a supply into the dryers.

The biomass maybe fed to a lock hopper, where an entrainment feed gas system feeds the dried biomass into a circulating fluidized bed bioreactor. Alternatively, the chips of biomass in their slightly wet form also may go through a biomass chip dryer system and then be stored as half-inch to three-quarter inch chips of biomass in a silo tank. The chips of biomass are then fed through a conveyor to a chip lock hopper and feed system into the circulating fluidized bed bio reformer in the first stage 110.

The circulating fluidized bed bio reformer produces the raw syngas and other reaction products sent to the cyclone system and moving bed in the outlet of the first stage 110. The gases from the first cyclone system may be fed to one of three pathways. The first potential pathway is through a catalytic reactor second stage system 120. The second potential pathway is through a thermal reactor second stage system 120. The thermal second stage system that operates a higher temperature may be a radiant heat reactor. The pathway through the thermal reactor does not need to use a catalyst but rather operates at a higher temperature.

In any of the possible stage 2 reactors, the second stage reduces the methane percentage by steam-reforming the methane into smaller molecules such as CO, $CO_2$, and $H_2$. The second stage of the BRR reduces the tars by cracking the light tars and virtually all of the heavy tars out of the chemical grade syngas stream. The chemical grade syngas stream from the second stage is sent to a syngas cleanup section to remove additional contaminants from the syngas, such as sulfur, water, and potassium, and other contaminants before sending the chemical grade syngas to downstream chemical processes.

The integrated plant includes the multiple stage bio-reforming reactor that generates a chemical grade syngas that is supplied to a transportation fuel back-end such as gasoline or high temperature Fischer Tropsch fuel products. The integrated plant receives raw biomass such as pine wood and converts the biomass into the transportation fuel. The integrated plant may use diverse biomass feedstocks and feedstock preparation methods (including chip size and powder size). The integrated plant may have a flexible configuration to feed reaction products (of both natural gas and biomass, or biomass only fed into the bio-reforming reactor) to meet regional requirements and to maximize economics.

In an embodiment, the two or more stages, such as the 1st stage and 2nd stage, forming the bio-reforming reactor converts the solid biomass from the chunk or particle preparation step into gaseous reactants including $CH_4$, $H_2$, $CO_2$, & CO. The syngas produced by the bio-reforming reactor can be low in carbon dioxide because by design a substantially stoichiometric amount of steam is supplied into the reactor and no additional oxygen is supplied as a reactant or fuel to drive the reaction in the decomposition reaction. Thus, a very low amount of oxygen is present and the decomposition reaction produces mainly CO rather than $CO_2$. The syngas from the biomass reforming reactor is also low in nitrogen, low in ammonia, low in sulfur content, and low in hydrogen cyanide ("HCN"). For example, the sulfur content of the syngas gas coming out of the bio-reforming reactor is barely over one part per million after the clean-up steps. In an embodiment, right out of the bio reforming reactor itself, the syngas stream could contain sulfur as high as 50 ppm; and the same is true for other constituents such as HCN, $NH_3$, etc. The woodchips used to produce the particles of biomass generally have a low sulfur content. Barely trace amounts of HCN, ammonia, are generated and trace amounts of nitrogen are present making the syngas virtually free of nitrogen, ammonia, and HCN, in the syngas stream coming out of the bio-reforming reactor. In contrast, syngas from coal contains high quantities of sulfur, amine, and HCN. Accordingly, the syngas cleanup components downstream of the bio-reforming reactor can be less inclusive and exclude some of the gas cleanup components needed for other biomass syngas producers, such as a coal-based syngas. Thus, compared to a coal-based syngas, an ammonia removal plant is not needed, a HCN removal plant is not needed, a nitrogen purge is not needed, and merely either the bulk sulfur removal or a sulfur guard bed is needed but not both. The lack of having to put multiple contaminant removal steps into the gas cleanup portion of the integrated plant reduces both capital expenses for constructing and installing in that equipment as well as reducing operating expenses for having to operate the additional gas removal equipment and replace their catalysts/filters to remove the contaminants from the syngas stream.

The syngas stream from the decomposition coming out of the bio-reforming reactor may have a 1.1:1 or a 1.2:1 hydrogen to carbon monoxide ratio. A ratio controller with sensors located at the input of the high temperature Fischer-Tropsch train will control the hydrogen to carbon monoxide ratio of syngas going into the Fischer-Tropsch train. The ratio will be about 1.5:1 to 2.0:1 hydrogen to carbon monoxide controlled by the controller and measured by hydrogen and carbon monoxide sensors at that input. In an embodiment, $H_2$:CO ratios of 1.8:1 to as high as 2.1:1 are in the syngas stream because of the steam in the process and the amount of water gas shift that goes on. The downside is that too much $CO_2$ may be made for the Fischer-Tropsch train and some $CO_2$ removal may be inline or an additive may be added in the reactor process itself. However, the syngas to Methanol ("MeOH") train does not mind $CO_2$ since it is a chemical reactant in this process. Sensors can also be located at the output of the bio-reforming reactor as well as the steam methane reforming reactor to have a ratio control system to know what the molarity of the syngas being supplied by each of these reactors is in order to know the proper volumes to mix to get the end result of having a combined syngas from the steam methane reforming reactor and the bio-reforming reactor between, for example, the range of 1.5:1 and 2.0:1. The ratio control system will also send feedback to both the bio-reforming reactor and the steam methane reforming reactor in order to control the volume of syngas being produced by both of those reactors.

Methods

A method of an integrated plant can include, but is not limited to, forming a bio-reforming reactor having at least a first stage of the bio-reforming reactor (e.g., the first stage 110 of FIG. 1) interconnected with a second stage (e.g., the second stage 120 of FIG. 1) of the bio-reforming reactor, generating syngas with the bio-reforming reactor, and managing heat-absorbing media used in generating the syngas with the bio-reforming reactor. Generating the syngas includes feeding wood-containing biomass to the bio-reforming reactor and generating the syngas from the biomass for any one or more reactor trains downstream of the second stage of the bio-reforming reactor. The one or more reactor trains are selected from 1) a methanol synthesis reactor train, 2) a methanol-to-gasoline reactor train, and 3) a Fischer-Tropsch reactor train, where any fuel products produced by the one or more reactor trains have a biogenic content of between 50% and 100%. Feeding the biomass to the bio-reforming reactor includes receiving the biomass by one or more biomass inputs of a fluidized-bed gasifier of the first stage of the bio-reforming reactor. Generating the syngas further includes causing a set of chemical reactions in the biomass to produce reaction products of constituent gases, tars, chars, and other components; sending at least some of the reaction products through a moving-bed filtration system of the first stage of the bio-reforming reactor to produce a stream of raw syngas; and receiving the stream of raw syngas by one or more inputs of one or more reactors of the second stage of the bio-reforming reactor. The raw syngas is subjected to further processing within the one or more reactors of the second stage to yield a chemical grade syngas. The further processing includes at least cracking light hydrocarbons ($C_1$-$C_4$) into constituent molecules for the one or more selected reactor trains. Managing the heat-absorbing media used in generating the syngas includes receiving the media by one or more media inputs of the gasifier, circulating the media in a vessel of the gasifier, and sending the media through one or more outputs of the gasifier to supply the media to another operation unit in a media recirculation loop. Managing the heat-absorbing media used in generating the syngas also includes receiving the media by one or more media inputs of a fluidized-bed combustor of the first stage of the bio-reforming reactor, circulating the media in a vessel of the combustor, and sending the media through one or more outputs of the combustor to supply the media to another operation unit in the media recirculation loop. Managing the heat-absorbing media used in generating the syngas also includes receiving the media by one or more media inputs of the moving-bed filtration system, packing a filtration bed of the moving-bed filtration system, and sending the media through one or more outputs of the moving-bed filtration system to supply the media to another operation unit in the media recirculation loop.

The method of the integrated plant can further include receiving by a first cyclone system a stream of the media and the reaction products of constituent gases, tars, chars, and other components from the gasifier by way of a first portion of the media recirculation loop; separating with the first cyclone system at least the media and the chars from the stream; and supplying the media and the chars to the combustor by way of a second portion of the media recirculation loop.

The method of the integrated plant can further include combusting with the combustor at least the char in the presence of the media as received from the first cyclone system to produce a waste stream of gas and ash, as well as sending to the gasifier a stream of media having a reduced amount of char by way of a third portion of the media recirculation loop.

The method of the integrated plant can further include receiving by a second cyclone system the waste stream of gas and ash from the combustor; separating with the second cyclone system the gas and ash from the waste stream; treating the gas before emitting it to the atmosphere; and disposing the ash.

The method of the integrated plant can further include separating with the first cyclone system at least some of the tars from the stream of the media and the reaction products of constituent gases, tars, chars, and other components received from the gasifier by way of the first portion of the media recirculation loop. The first cyclone system subsequently supplies a stream of the reaction products including the tars to the moving-bed filtration system for reforming heavier tars into lighter tars with a TPR of the moving-bed filtration system. As such, the heavier tars are captured with the moving-bed filtration system, and the heavier tars are reformed into the lighter tars with the TPR of the moving-bed filtration system.

Capturing the heavier tars with the moving-bed filtration system includes capturing the heavier tars with a design of the moving-bed filtration system selected from a counter-current flow, a co-current flow, and a radial flow. In the counter-current flow design of the moving bed filtration system, the media is fed into a top of the moving-bed filtration system, down through a center of the moving-bed filtration system, and discharged from a bottom of the moving-bed filtration system while the stream of the reaction products including the tars from the gasifier are fed into the bottom of the moving-bed filtration system, up through the center of the moving-bed filtration system, and discharged from the top of the moving-bed filtration system. In the co-current flow design of the moving bed filtration system, in which the media is fed into the top of the moving-bed filtration system, down through the center of the moving-bed filtration system, and discharged from the bottom of the moving-bed filtration system while the stream of the reaction products including the tars from the gasifier is fed into the top of the moving-bed filtration system, down through the center of the moving-bed filtration system, and discharged from the bottom of the moving-bed filtration system. In the radial flow design of the moving bed filtration system, the media is fed into a top of the moving-bed filtration system, down through an inner cylindrical shell of the moving-bed filtration system, and discharged from a bottom of the moving-bed filtration system while the stream of the reaction products including the tars from the gasifier is fed into the bottom of the moving-bed filtration system, up through an outer cylindrical shell of the moving-bed filtration system, radially through the inner cylindrical shell of the moving-bed filtration system to central chamber of the moving-bed filtration system, and discharged from the top of the moving-bed filtration system. Alternatively in the radial flow design, the stream of the reaction products including the tars from the gasifier is fed into the bottom of the moving-bed filtration system, up through the central chamber of the moving-bed filtration system, radially through the inner cylindrical shell of the moving-bed filtration system to the outer cylindrical shell of the moving-bed filtration system, and discharged from the top of the moving-bed filtration system.

The method of the integrated plant can further include moving the media through the moving-bed filtration system with a minimal fluidization velocity of about 0.5 ft/s. Such media is packed in the filtration bed of the moving-bed filtration system using one or more materials for the media selected from silica-based sand, olivine, ilmenite, dolomite, a zeolite catalytic material, sulfur-adsorbing minerals including magnesium spinels, magnesium oxide, and ash. The media has a particle size of 400-800 microns at a time of the packing.

The method of the integrated plant can further include adding makeup media to the media recirculation loop by way of the one or more media inputs of the gasifier configured to receive the media. Each of the gasifier and the combustor is a circulating fluidized-bed reactor in such embodiments.

The method of the integrated plant can further include adding makeup media to the media recirculation loop by way of the one or more media inputs of the combustor configured to receive the media. The gasifier is a circulating fluidized-bed reactor and the combustor is a bubbling fluidized-bed reactor in such embodiments.

The method of the integrated plant can further include indirectly adding makeup media to the media recirculation loop by way of one or more media inputs of the moving-bed filtration system configured to receive the media. The moving-bed filtration system is configured to provide the makeup media to the combustor in a stream of the media including a reduced amount of the heavier tars than the stream of the reaction products including the tars from the gasifier. The gasifier is a circulating fluidized-bed reactor and the combustor is a bubbling fluidized-bed reactor in such embodiments.

The method of the integrated plant can further include practicing at least one operating regime of the first stage of the bio-reforming reactor. The at least one operating regime includes reacting the biomass in the gasifier (i) at a temperature of 700-1000° C., (ii) at a pressure of 20-300 psig, (iii) with a steam to biomass ratio (weight basis) from 0.5:1 up to 1.5:1 depending upon a type of the biomass, its moisture content, and operating objectives, (iv) with a media to biomass circulation rates from 15:1 to 60:1, and (v) for a residence time of 0.5-30 seconds to cause the set of chemical reactions in the biomass to produce the reaction products of constituent gases, tars, chars, and other components.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An integrated plant, comprising:
   an interconnected set of two or more stages of reactors forming a bio-reforming reactor configured to generate syngas for any one or more reactor trains selected from 1) a methanol synthesis reactor train, 2) a methanol-to-gasoline reactor train, and 3) a Fischer-Tropsch reactor train, the syngas derived from biomass fed to the bio-reforming reactor, where the biomass includes wood, where any fuel products produced by the one or more reactor trains have a biogenic content of between 50% and 100%, wherein:
- a first stage of the bio-reforming reactor includes a fluidized-bed gasifier that has one or more biomass inputs to receive the biomass, one or more media inputs to receive heat-absorbing media for circulation of the media in a vessel of the gasifier, and one or more outputs to supply at least the media to another operation unit for recirculation in a media recirculation loop,
- the first stage of the bio-reforming reactor further includes a fluidized-bed combustor that has one or more media inputs to receive the media for circulation of the media in a vessel of the combustor, as well as one or more outputs to supply at least the media to another operation unit for recirculation in the media recirculation loop,
- the first stage of the bio-reforming reactor further includes a moving-bed filtration system that has one or more media inputs to receive the media for packing a filtration bed of the moving-bed filtration system, as well as one or more outputs to supply at least the media to another operation unit for recirculation in the media recirculation loop,
- the first stage is configured to cause a set of chemical reactions in the biomass to produce reaction products of constituent gases, tars, chars, and other components, some of which reaction products exit the first stage through the moving-bed filtration system as a raw syngas, and
- a second stage of the bio-reforming reactor has an input configured to receive a stream of the raw syngas, and then chemically reacts the raw syngas within one or more reactors of the second stage to yield a chemical grade syngas by further processing including at least cracking light hydrocarbons ($C_1$-$C_4$) into constituent molecules for the any one or more of the selected reactor trains.

2. The integrated plant of claim 1, further comprising:
a first cyclone system configured to
- (i) receive a stream of the media and the reaction products of constituent gases, tars, chars, and other components from the gasifier by way of a first portion of the media recirculation loop, and
- (ii) separate at least the media and the chars from the stream and supply the media and the chars to the combustor by way of a second portion of the media recirculation loop,
wherein the combustor is configured to
- (i) further combust at least the char in the presence of the media as received from the first cyclone system to produce a waste stream of gas and ash, and
- (ii) provide a stream of media having a reduced amount of char to the gasifier by way of a third portion of the media recirculation loop.

3. The integrated plant of claim 2, further comprising:
a second cyclone system configured to
- (i) receive the waste stream of gas and ash from the combustor,
- (ii) separate the gas from the waste stream for treatment of the gas before emitting it to the atmosphere, and
- (iii) separate the ash from the waste stream for disposal.

4. The integrated plant of claim 2, further comprising:
a tar pre-reformer ("TPR") as part of the moving-bed filtration system configured to capture heavier tars and reform the heavier tars into lighter tars,
wherein the first cyclone system is further configured to
- (i) separate at least some of the tars from the stream of the media and the reaction products of constituent gases, tars, chars, and other components from the gasifier by way of the first portion of the media recirculation loop, and
- (ii) supply a stream of the reaction products including the tars to the moving-bed filtration system for reforming the heavier tars into the lighter tars with the TPR.

5. The integrated plant of claim 4,
wherein the moving-bed filtration system is configured for
- (i) a counter-current flow in which the media is fed into a top of the moving-bed filtration system, down through a center of the moving-bed filtration system, and discharged from a bottom of the moving-bed filtration system while the stream of the reaction products including the tars from the gasifier are fed into the bottom of the moving-bed filtration system, up through the center of the moving-bed filtration system, and discharged from the top of the moving-bed filtration system,
- (ii) a co-current flow in which the media is fed into the top of the moving-bed filtration system, down through the center of the moving-bed filtration system, and discharged from the bottom of the moving-bed filtration system while the stream of the reaction products including the tars from the gasifier is fed into the top of the moving-bed filtration system, down through the center of the moving-bed filtration system, and discharged from the bottom of the moving-bed filtration system,
- (iii) a radial flow in which the media is fed into the top of the moving-bed filtration system, down through an inner cylindrical shell of the moving-bed filtration system, and discharged from a bottom of the moving-bed filtration system while the stream of the reaction products including the tars from the gasifier is fed into the bottom of the moving-bed filtration system, up through a central chamber of the moving-bed filtration system, radially through the inner cylindrical shell of the moving-bed filtration system to an outer cylindrical shell of the moving-bed filtration system, and discharged from the top of the moving-bed filtration system, or
- (iv) a radial flow in which the media is fed into the top of the moving-bed filtration system, down through the inner cylindrical shell of the moving-bed filtration system, and discharged from the bottom of the moving-bed filtration system while the stream of the reaction products including the tars from the gasifier is fed into the bottom of the moving-bed filtration system, up through the outer cylindrical shell of the moving-bed filtration system, radially through the inner cylindrical shell of the moving-bed filtration system to the central chamber of the moving-bed filtration system, and discharged from the top of the moving-bed filtration system.

6. The integrated plant of claim 5,
wherein the media obtained from a slipstream of 1-10% from circulating media from the combustor and putting it in the TPR is one or more materials selected from silica-based sand, olivine, ilmenite, dolomite, a zeolite catalytic material, sulfur-adsorbing minerals including magnesium spinels, magnesium oxide, and ash, and wherein the media has a particle size of 400-800 microns and is moved through the moving-bed filtration system with a minimal fluidization velocity of about 0.5 ft/s.

7. The integrated plant of claim 4, wherein each of the gasifier and the combustor is a circulating fluidized-bed reactor, and wherein makeup media is added to the media recirculation loop by way of the one or more media inputs of the gasifier configured to receive the media.

8. The integrated plant of claim 4, wherein the gasifier is a circulating fluidized-bed reactor and the combustor is a bubbling fluidized-bed reactor, and wherein makeup media is added to the media recirculation loop by way of the one or more media inputs of the combustor configured to receive the media.

9. The integrated plant of claim 4, wherein the gasifier is a circulating fluidized-bed reactor and the combustor is a bubbling fluidized-bed reactor, wherein makeup media is indirectly added to the media recirculation loop by way of one or more media inputs of the moving-bed filtration system configured to receive the media, and wherein the moving-bed filtration system is configured to provide the makeup media to the combustor in a stream of the media including a reduced amount of the heavier tars than a stream of the reaction products including the tars from the gasifier.

10. The integrated plant of claim 1, wherein at least one operating regime of the first stage of the bio-reforming reactor includes reacting the biomass in the gasifier (i) at a temperature of 700-1000° C., (ii) at a pressure of 20-300 psig, (iii) with a steam to biomass ratio (weight basis) from 0.5:1 up to 1.5:1 depending upon a type of the biomass, its moisture content, and operating objectives, (iv) with a media to biomass circulation rates from 15:1 to 60:1, and (v) for a residence time of 0.5-30 seconds to cause the set of chemical reactions in the biomass to produce the reaction products of constituent gases, tars, chars, and other components.

11. A method of an integrated plant, comprising:

a) forming a bio-reforming reactor having at least a first stage and a second stage of the bio-reforming reactor that are interconnected;

b) generating syngas, including:

feeding biomass including wood to the bio-reforming reactor and generating syngas from the biomass for any one or more reactor trains downstream of the second stage of the bio-reforming reactor selected from 1) a methanol synthesis reactor train, 2) a methanol-to-gasoline reactor train, and 3) a Fischer-Tropsch reactor train, where any fuel products produced by the one or more reactor trains have a biogenic content of between 50% and 100%, wherein feeding the biomass to the bio-reforming reactor includes receiving the biomass by one or more biomass inputs of a fluidized-bed gasifier of the first stage of the bio-reforming reactor;

causing a set of chemical reactions in the biomass to produce reaction products of constituent gases, tars, chars, and other components;

sending at least some of the reaction products through a moving-bed filtration system of the first stage of the bio-reforming reactor to produce a stream of raw syngas;

receiving the stream of raw syngas by one or more inputs of one or more reactors of the second stage of the bio-reforming reactor;

further processing the raw syngas within the one or more reactors of the second stage to yield a chemical grade syngas, the further processing including at least cracking light hydrocarbons ($C_1$-$C_4$) into constituent molecules for the one or more of the selected reactor trains; and c) managing heat-absorbing media used in generating the syngas, including:

receiving the media by one or more media inputs of the gasifier, circulating the media in a vessel of the gasifier, and sending the media through one or more outputs of the gasifier to supply the media to another operation unit in a media recirculation loop;

receiving the media by one or more media inputs of a fluidized-bed combustor of the first stage of the bio-reforming reactor, circulating the media in a vessel of the combustor, and sending the media through one or more outputs of the combustor to supply the media to another operation unit in the media recirculation loop; and receiving the media by one or more media inputs of the moving-bed filtration system, packing a filtration bed of the moving-bed filtration system, and sending the media through one or more outputs of the moving-bed filtration system to supply the media to another operation unit in the media recirculation loop.

12. The method of claim 11, further comprising:

receiving by a first cyclone system a stream of the media and the reaction products of constituent gases, tars, chars, and other components from the gasifier by way of a first portion of the media recirculation loop;

separating with the first cyclone system at least the media and the chars from the stream and supplying the media and the chars to the combustor by way of a second portion of the media recirculation loop;

further combusting with the combustor at least the char in the presence of the media as received from the first cyclone system to produce a waste stream of gas and ash; and sending from the combustor a stream of media having a reduced amount of char to the gasifier by way of a third portion of the media recirculation loop.

13. The method of claim 12, further comprising:

receiving by a second cyclone system the waste stream of gas and ash from the combustor;

separating with the second cyclone system the gas from the waste stream and treating the gas before emitting it to the atmosphere; and separating the ash from the waste stream and disposing the ash.

14. The method of claim 12, further comprising:

separating with the first cyclone system at least some of the tars from the stream of the media and the reaction products of constituent gases, tars, chars, and other components received from the gasifier by way of the first portion of the media recirculation loop;

supplying by the first cyclone system a stream of the reaction products including the tars to the moving-bed filtration system for reforming heavier tars into lighter tars with a tar pre-reformer ("TPR") of the moving-bed filtration system; and capturing the heavier tars with the moving-bed filtration system and reforming the heavier tars into the lighter tars with the TPR of the moving-bed filtration system.

15. The method of claim 14, wherein capturing the heavier tars with the moving-bed filtration system includes capturing the heavier tars with a design of the moving-bed filtration system selected from a counter-current flow, a co-current flow, and a radial flow, wherein, in the counter-current flow design of the moving bed filtration system, the media is fed into a top of the moving-bed filtration system, down through a center of the moving-bed filtration system, and discharged from a bottom of the moving-bed filtration system while the stream of the reaction products including the tars from the gasifier are fed into the bottom of the moving-bed filtration system, up through the center of the moving-bed filtration system, and discharged from the top of the moving-bed filtration system, wherein, in the co-current flow design of the moving bed filtration system, in which the media is fed into the top of the moving-bed filtration system, down through the center of the moving-bed filtration system, and discharged from the bottom of the moving-bed filtration system while the stream of the reaction products including the tars from the gasifier is fed into the top of the moving-bed filtration system, down through the center of the moving-bed filtration system, and discharged from the bottom of the moving-bed filtration system, and wherein, in the radial flow design of the moving bed filtration system, in which the media is fed into the top of the moving-bed filtration system, down through an inner cylindrical shell of the moving-bed filtration system, and discharged from the bottom of the moving-bed filtration system while the stream of the reaction products including the tars from the gasifier is fed into the bottom of the moving-bed filtration system, up through a central chamber of the moving-bed filtration system, radially through the inner cylindrical shell of the moving-bed filtration system to an outer cylindrical shell of the moving-bed filtration system, and discharged from the top of the moving-bed filtration system.

16. The method of claim 15, further comprising:

moving the media through the moving-bed filtration system with a minimal fluidization velocity of about 0.5 ft/s, wherein packing the filtration bed of the moving-bed filtration system includes packing the filtration bed with one or more materials for the media selected from silica-based sand, olivine, ilmenite, dolomite, a zeolite catalytic material, sulfur-adsorbing minerals including magnesium spinels, magnesium oxide, and ash, the media having a particle size of 400-800 microns at a time of the packing.

17. The method of claim 14, further comprising:

adding makeup media to the media recirculation loop by way of the one or more media inputs of the gasifier configured to receive the media, wherein each of the gasifier and the combustor is a circulating fluidized-bed reactor.

18. The method of claim 14, further comprising:

adding makeup media to the media recirculation loop by way of the one or more media inputs of the combustor configured to receive the media, wherein the gasifier is a circulating fluidized-bed reactor and the combustor is a bubbling fluidized-bed reactor.

19. The method of claim 14, further comprising:

indirectly adding makeup media to the media recirculation loop by way of one or more media inputs of the moving-bed filtration system configured to receive the media, wherein the moving-bed filtration system is configured to provide the makeup media to the combustor in a stream of the media including a reduced amount of the heavier tars than the stream of the reaction products including the tars from the gasifier, and wherein the gasifier is a circulating fluidized-bed reactor and the combustor is a bubbling fluidized-bed reactor.

20. The method of claim 11, further comprising:

practicing at least one operating regime of the first stage of the bio-reforming reactor, which includes reacting the biomass in the gasifier
(i) at a temperature of 700-1000° C.,
(ii) at a pressure of 20-300 psig,
(iii) with a steam to biomass ratio (weight basis) from 0.5:1 up to 1.5:1 depending upon a type of the biomass, its moisture content, and operating objectives,
(iv) with a media to biomass circulation rates from 15:1 to 60:1, and
(v) for a residence time of 0.5-30 seconds to cause the set of chemical reactions in the biomass to produce the reaction products of constituent gases, tars, chars, and other components.

* * * * *